United States Patent
Crawford et al.

(10) Patent No.: US 7,196,758 B2
(45) Date of Patent: Mar. 27, 2007

(54) METHOD OF ALIGNMENT OF LIQUID CRYSTALS COMPRISING EXPOSING AN ALIGNMENT MATERIAL TO AN INTERFERENCE PATTERN

(75) Inventors: Gregory P. Crawford, Providence, RI (US); James N. Eakin, Providence, RI (US); Marc D. Radcliffe, Newport, MN (US)

(73) Assignees: 3M Innovative Properties Company, St. Paul, MN (US); Brown University, Providence, RI (US)

( * ) Notice: Subject to any disclaimer, the term of this patent is extended or adjusted under 35 U.S.C. 154(b) by 81 days.

(21) Appl. No.: 10/748,562

(22) Filed: Dec. 30, 2003

(65) Prior Publication Data

US 2005/0140837 A1    Jun. 30, 2005

(51) Int. Cl.
*G02F 1/1337* (2006.01)
(52) U.S. Cl. .................. 349/129; 349/123; 349/124
(58) Field of Classification Search ............. 349/127
See application file for complete search history.

(56) References Cited

U.S. PATENT DOCUMENTS

| | | | | |
|---|---|---|---|---|
| 5,096,282 A | * | 3/1992 | Margerum et al. ......... 359/3 |
| 5,389,698 A | | 2/1995 | Chigrinov et al. | |
| 5,652,634 A | * | 7/1997 | Hirata et al. ............. 349/129 |
| 5,796,459 A | * | 8/1998 | Bryan-Brown et al. ..... 349/132 |
| 5,838,407 A | | 11/1998 | Chigrinov et al. | |
| 5,909,265 A | | 6/1999 | Kim et al. | |
| 5,929,957 A | * | 7/1999 | Noh ....................... 349/127 |
| 6,067,141 A | * | 5/2000 | Yamada et al. ........... 349/129 |
| 6,153,272 A | * | 11/2000 | Kim et al. ................. 428/1.5 |
| 6,184,958 B1 | * | 2/2001 | Lim et al. ................. 349/124 |
| 6,242,061 B1 | * | 6/2001 | Gibbons et al. .......... 428/1.27 |
| 6,292,244 B1 | * | 9/2001 | Kuo et al. ................. 349/129 |
| 6,433,850 B2 | * | 8/2002 | Reznikov et al. .......... 349/124 |
| 6,876,417 B1 | * | 4/2005 | Seiberle et al. ........... 349/124 |
| 2002/0067451 A1 | * | 6/2002 | Hattori et al. ............ 349/129 |
| 2002/0149849 A1 | * | 10/2002 | Kelsey et al. ............. 359/577 |

FOREIGN PATENT DOCUMENTS

JP          08095045 A  *  4/1996

OTHER PUBLICATIONS

Nikolova, L. and Todorov, T.; "Diffraction Efficiency and Selectivity of Polarization Holographic Recording", *Optica Acta* (1984); vol. 31, No. 5; pp. 579-588.

Ichimura, K., et al; "Reversible Change in Alignment Mode of Nematic Liquid Crystals Regulated Photochemically by 'Command Surfaces' Modified with an Azobenzene Monolayer", *Langmuir* (1988); vol. 4; American Chemical Society; pp. 1214-1216.

(Continued)

*Primary Examiner*—Andrew Schechter
*Assistant Examiner*—W. Patty Chen
(74) *Attorney, Agent, or Firm*—Gregg H. Rosenblatt

(57) ABSTRACT

A method includes exposing an alignment material to an interference pattern to cause a chemical reaction in the alignment material and exposing the alignment material to a liquid crystal, where the liquid crystal aligns relative to the alignment material based on the interference pattern.

30 Claims, 25 Drawing Sheets

OTHER PUBLICATIONS

Ichimura, K., et al; "Reversible Alignment Change of Liquid Crystals Induced Photochromic Molecular Films, . . . ", *Makromol. Chem., Rapid Commun.* (1989); vol. 10; pp. 5-8.

Gibbons, W.M., et al; "Surface-Mediated Alignment of Nematic Liquid Crystals with Polarized Laser Light", *Nature* (May 2, 1991); vol. 351; pp. 49-50.

Schadt, M., et al; "Surface-Induced Parallel Alignment of Liquid Crystals by Linearly Polymerized Photopolymers", *Jpn.Journal of Applied Physics* (1992); vol. 31; pp. 2155-2164.

Shannon, P.J., et al; "Patterned Optical Properties in Photopolymerized Surface-Aligned Liquid-Crystal Films", *Nature* (Apr. 7, 1994); vol. 368; pp. 532-533.

Hasegawa, M., and Taira, Y.; "Nematic Homogeneous Alignment by Photo Depolymerization of Polyimide", *Conf.Record, 14th International Display Research Conference, Monterey* (1994); Society for Information Display, San Jose, CA; pp. 213-216.

Schadt, M., et al; "Photo-Generation of Linerly Polymerized Liquid Crystal Aligning Layers Comprising Novel, Integrated Optically Patterned Retarders and Color Filters", *Jpn.Journal of Applied Physics* (1995); vol. 34; pp. 3240-3249.

Schadt, M., et al; "Optical Patterning of Multi-Domain Liquid-Crystal Displays with Wide Viewing Angles", *Nature* (May 16, 1996); vol. 381; pp. 212-215.

Kitzerow, H.-S.; "Polymer-Dispersed and Polymer-Stabilized Chiral Liquid Crystals", *Liquid Crystals in Complex Geometries: Formed Polymer and Porous Networks* (1996); Ed. G.P. Crawford & S. Zumer; Taylor & Francis; pp. 187-219.

Ichimura, K., et al; "Photoreactivity of Polymers with Regioisomeric Cinnamate Side Chains and Their Ability to Regulate Liquid Crystal Alignment", *Macromolecules* (1997); vol. 30, American Chemical Society; pp. 903-911.

Reznikov, Y., et al; "Photoalignment of Liquid Crystals by Liquid Crystals", *Physical Review Letters* (Feb. 28, 2000); vol. 84, No. 9; American Physical Society; pp. 1930-1933.

Kurihara, R., et al; "P-68: Fabrication of Defect Free FLCDs Using Photo-Alignment and Their Performance Characteristics", *SID 00 Digest* (2000); ISSN0000-0966X/00/3101-0807; pp. 807-809.

Lee, B. and Clark, N.A.; "Alignment of Liquid Crystals with Patterned Isotropic Surfaces", *Science* (Mar. 30, 2001); vol. 291; pp. 2576-2580.

Ibn-Elhaj, M. and Schadt, M.; "Optical Polymer Thin Films with Isotropic and Anisotropic Nano-Corrugated Surface Topologies", *Nature* (Apr. 12, 2001); vol. 410; pp. 796-799.

Hasegawa, M.; "Fabrication of Freely Patterned Aligned Nematic Liquid Crystal Cells Using UV Laser Scanning Photoalignment", *Jpn.Journal of Applied Physics* (2002); vol. 41; pp. L201-L202.

Flanders, D.C., et al; "Alignment of Liquid Crystals Using Submicrometer Periodicity Gratings", *Applied Physics Letters* (May 15, 1978); vol. 32, No. 10; pp. 597-598.

Newsome, C.J., et al; "Laser Etched Gratings on Polymer Layers for Alignment of Liquid Crystals", *Applied Physics Letters* (Apr. 27, 1998); vol. 72, No. 17; pp. 2078-2080.

* cited by examiner

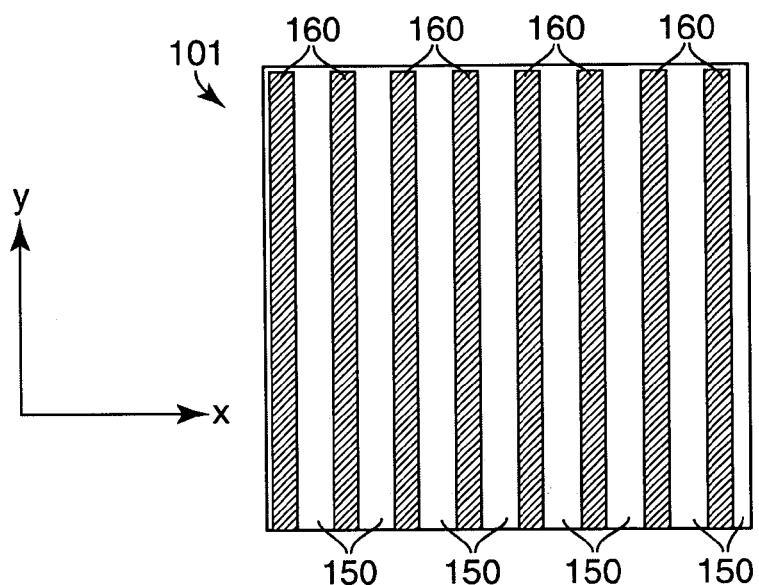
*FIG. 1B*
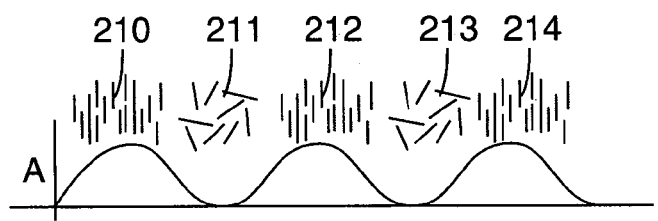
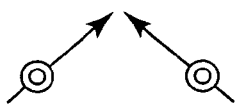
*FIG. 2A*      *FIG. 2B*
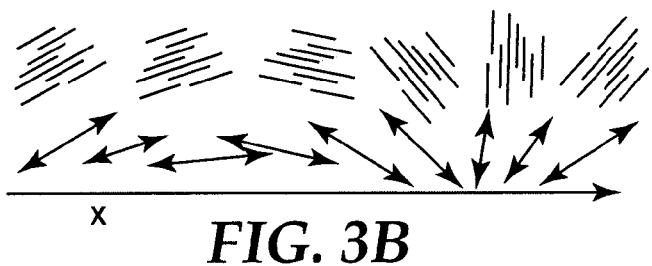
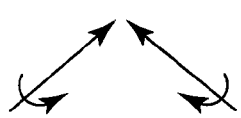
*FIG. 3A*      *FIG. 3B*
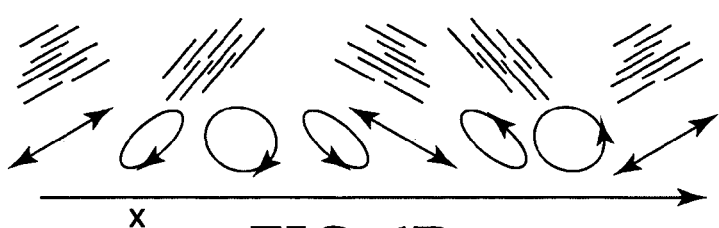
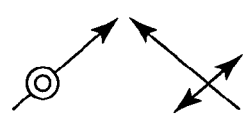
*FIG. 4A*      *FIG. 4B*

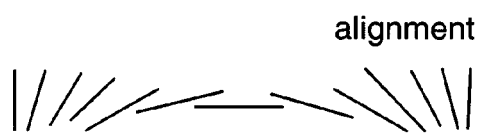
FIG. 12A alignment
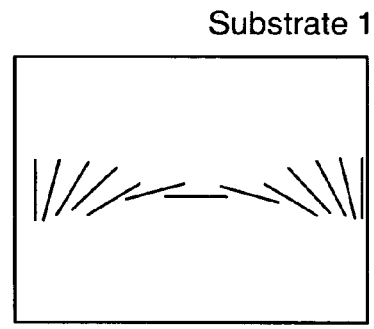
FIG. 12E Substrate 1
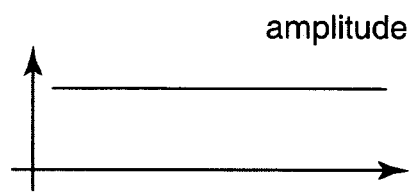
FIG. 12B amplitude
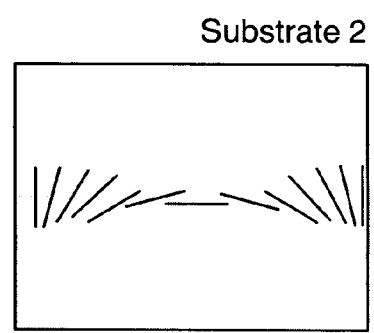
FIG. 12F Substrate 2
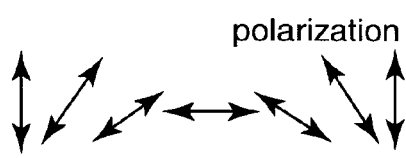
FIG. 12C polarization
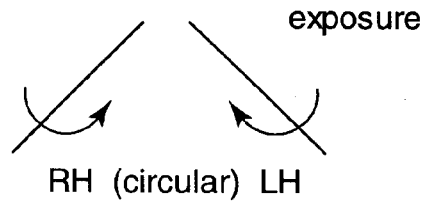
FIG. 12D exposure
RH (circular) LH
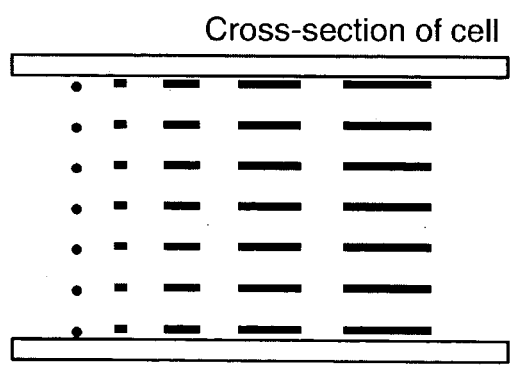
FIG. 12G Cross-section of cell alignment amplitude polarization exposure Substrate 1

Substrate 2

Cross-section of cell

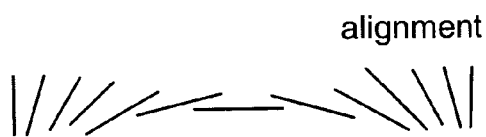
FIG. 14A  alignment
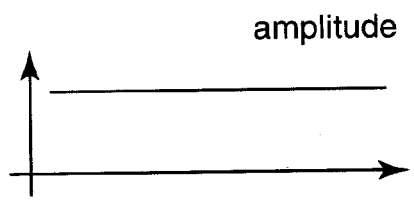
FIG. 14B  amplitude
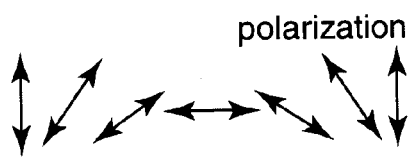
FIG. 14C  polarization
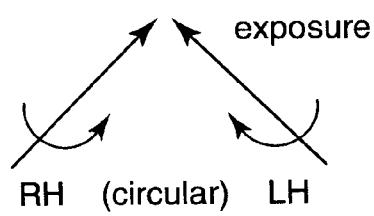
FIG. 14D  exposure
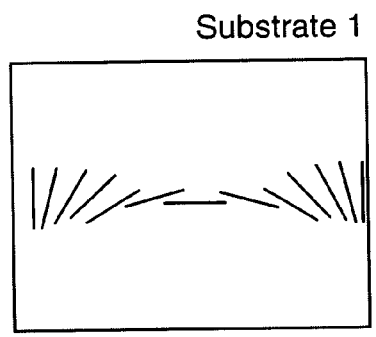
FIG. 14E  Substrate 1
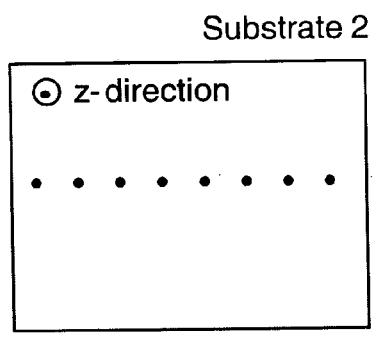
FIG. 14F  Substrate 2
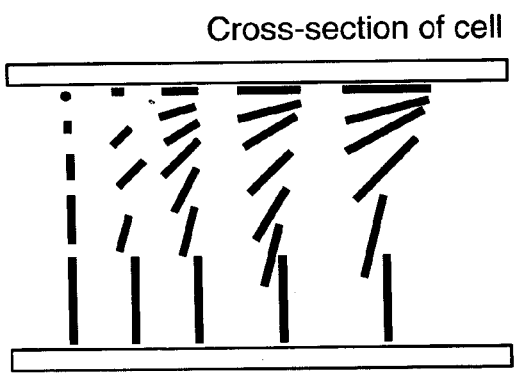
FIG. 14G  Cross-section of cell

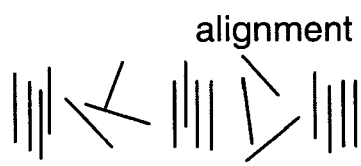
FIG. 16A alignment
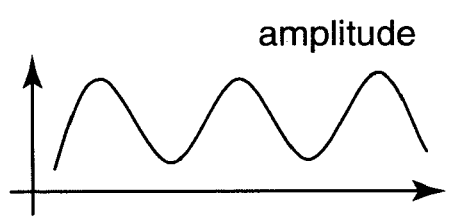
FIG. 16B amplitude
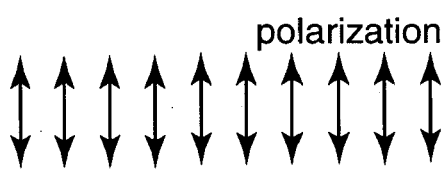
FIG. 16C polarization
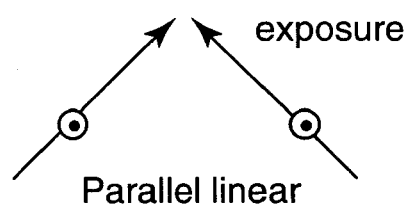
FIG. 16D exposure / Parallel linear
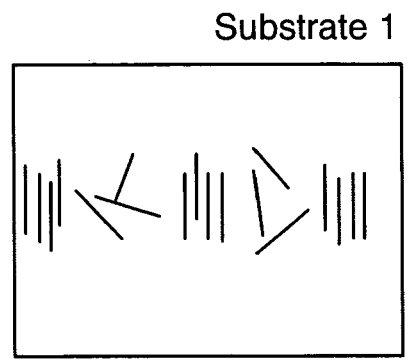
FIG. 16E Substrate 1
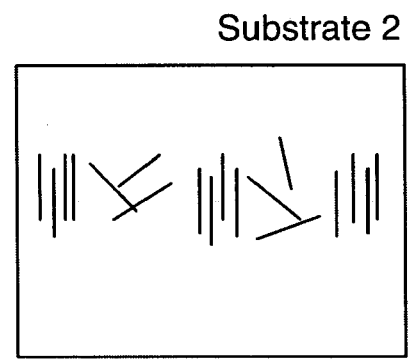
FIG. 16F Substrate 2
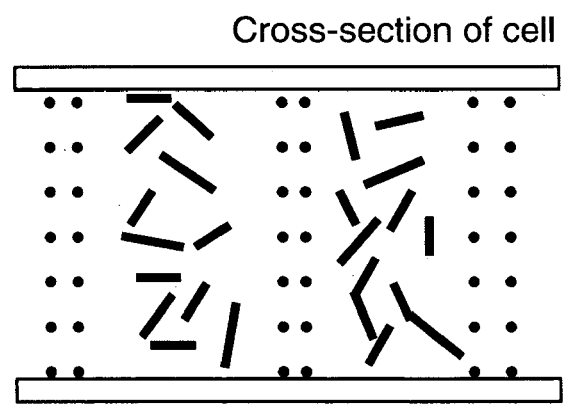
FIG. 16G Cross-section of cell

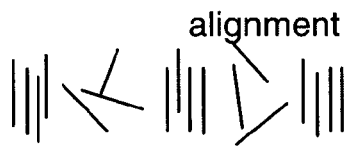
FIG. 17A alignment
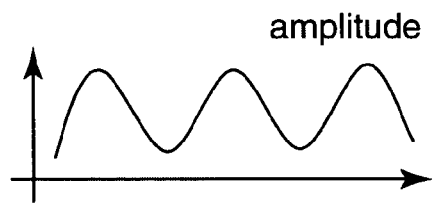
FIG. 17B amplitude
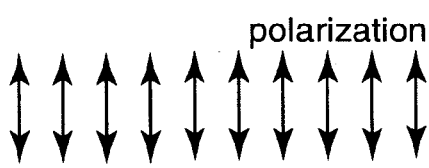
FIG. 17C polarization
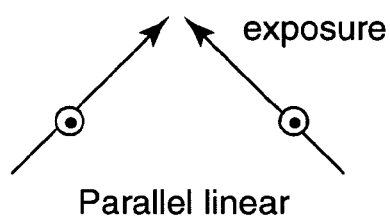
FIG. 17D exposure
Parallel linear
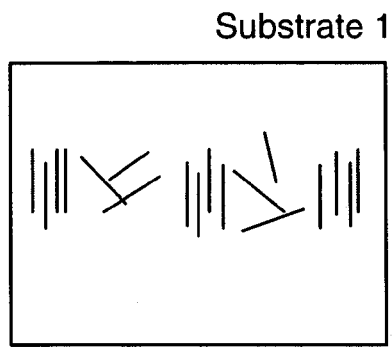
FIG. 17E Substrate 1
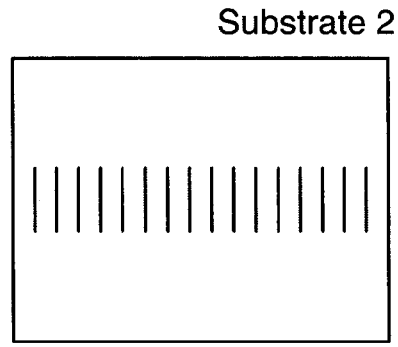
FIG. 17F Substrate 2
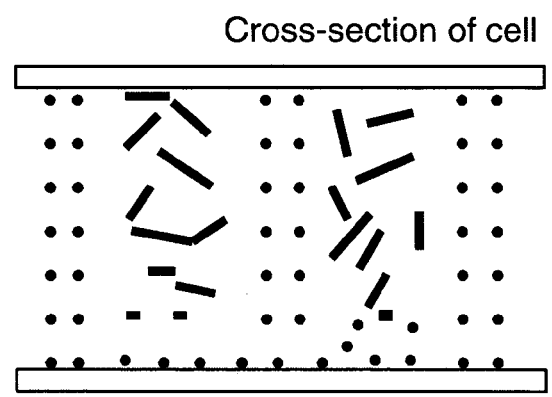
FIG. 17G Cross-section of cell

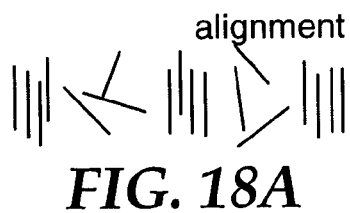
*FIG. 18A* alignment
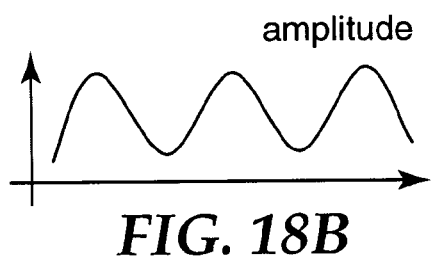
*FIG. 18B* amplitude
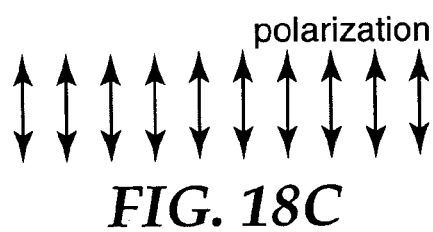
*FIG. 18C* polarization
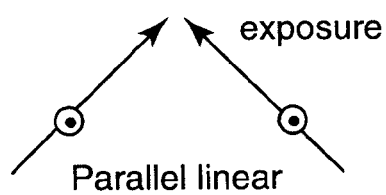
*FIG. 18D* exposure / Parallel linear
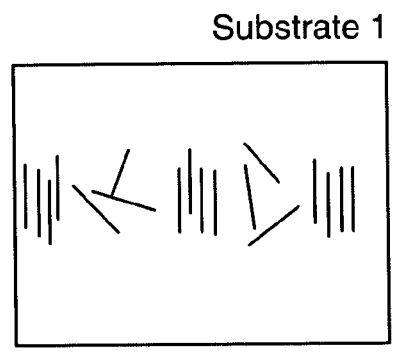
*FIG. 18E* Substrate 1
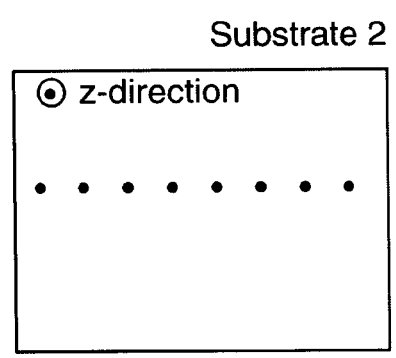
*FIG. 18F* Substrate 2 / z-direction
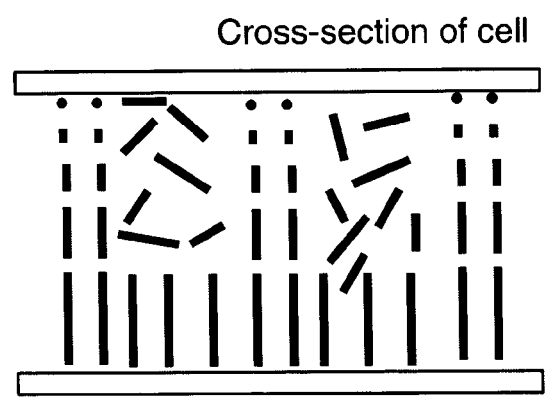
*FIG. 18G* Cross-section of cell alignment amplitude polarization

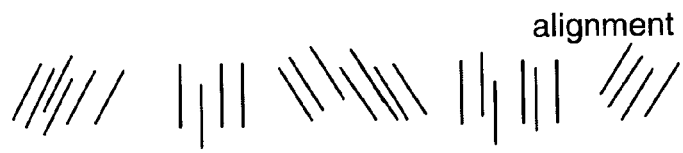
FIG. 21A alignment
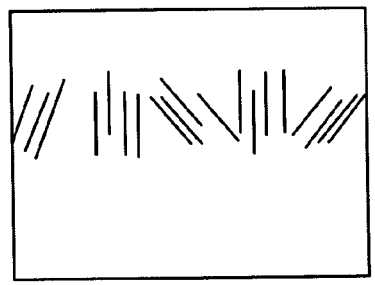
Substrate 1
FIG. 21E
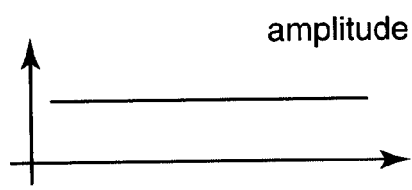
FIG. 21B amplitude
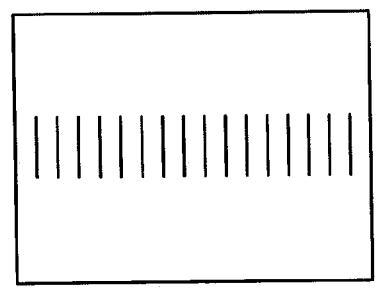
Substrate 2
FIG. 21F
FIG. 21C polarization
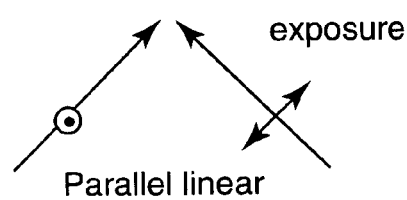
FIG. 21D exposure / Parallel linear
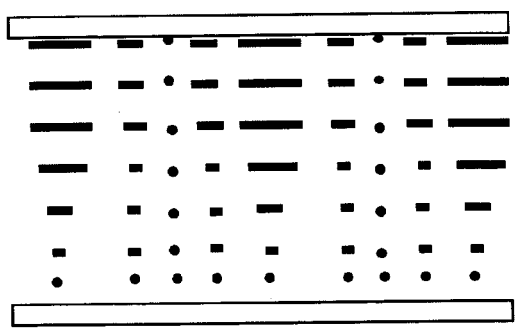
Cross-section of cell
FIG. 21G

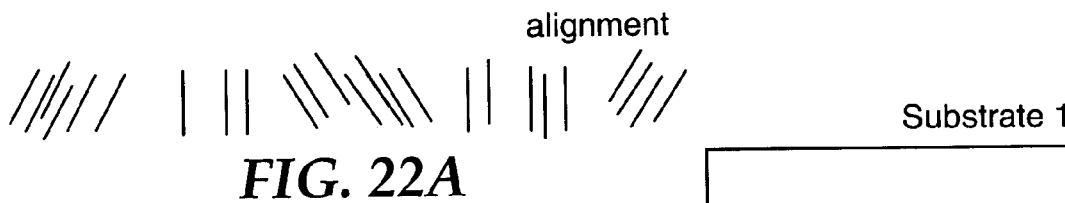
FIG. 22A alignment
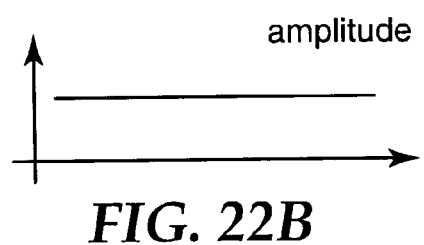
FIG. 22B amplitude
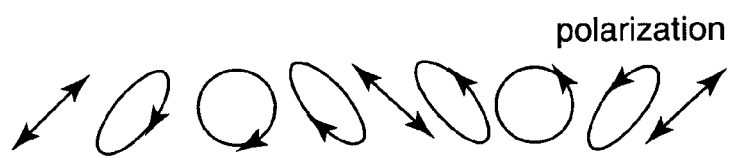
FIG. 22C polarization
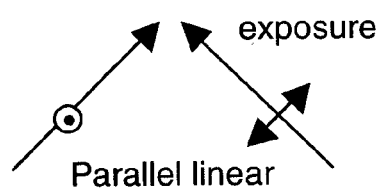
FIG. 22D exposure / Parallel linear
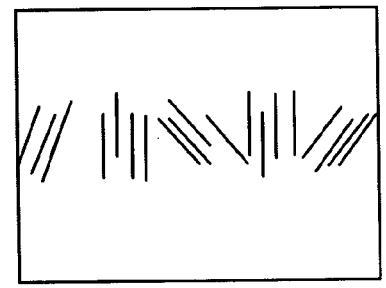
FIG. 22E Substrate 1
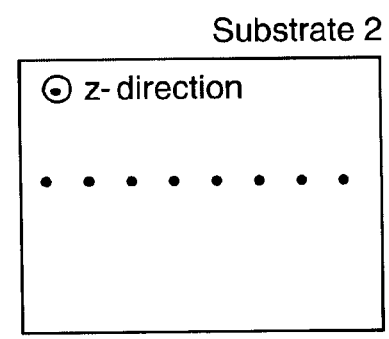
FIG. 22F Substrate 2 / z-direction
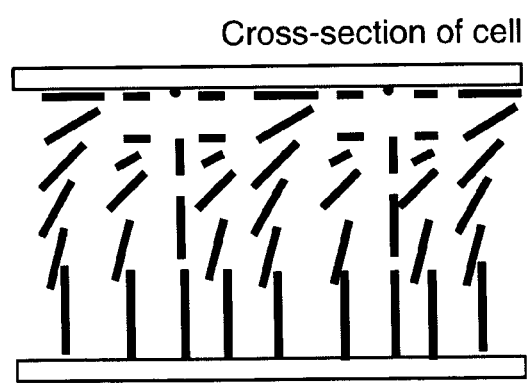
FIG. 22G Cross-section of cell

FIG. 23A alignment
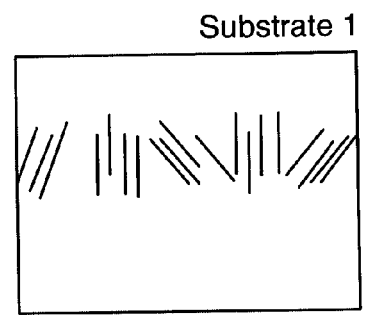
FIG. 23E Substrate 1
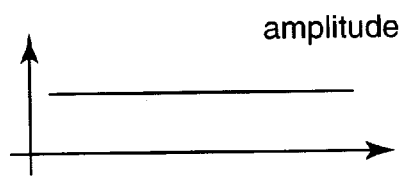
FIG. 23B amplitude
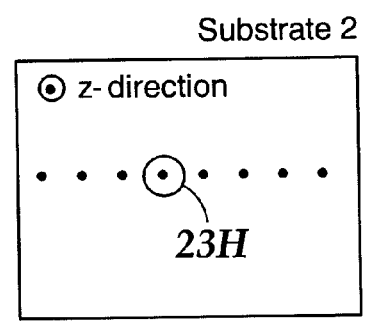
FIG. 23F Substrate 2, z-direction, 23H
FIG. 23C polarization
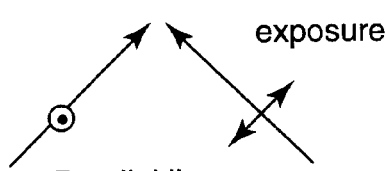
FIG. 23D exposure, Parallel linear
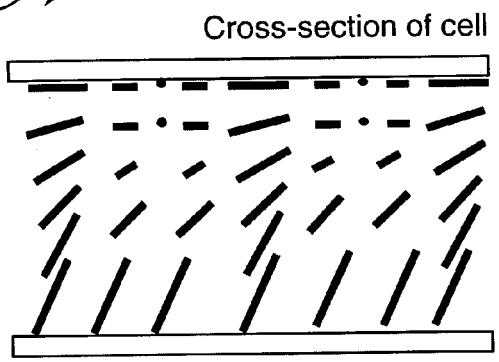
FIG. 23G Cross-section of cell
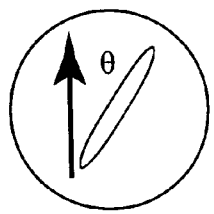
FIG. 23H alignment amplitude polarization exposure

Parallel linear

Substrate 1

Substrate 2

Cross-section of cell

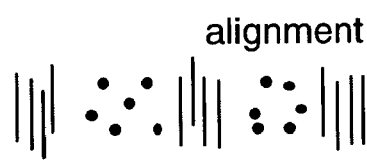
FIG. 25A alignment
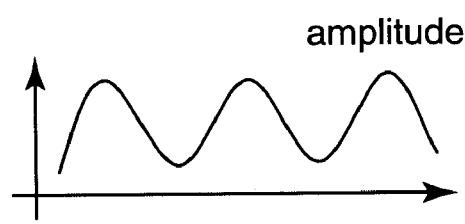
FIG. 25B amplitude
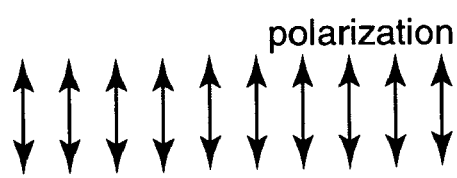
FIG. 25C polarization
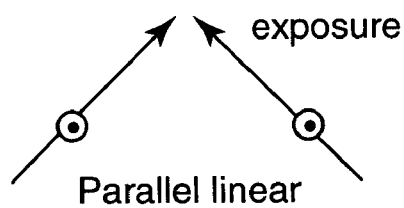
FIG. 25D exposure
Parallel linear
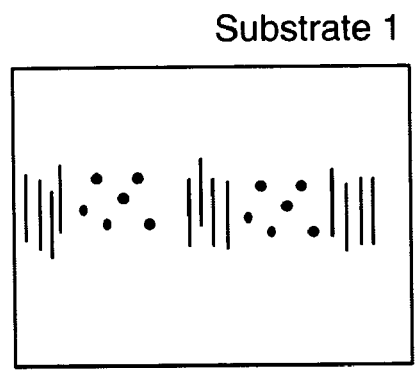
FIG. 25E Substrate 1
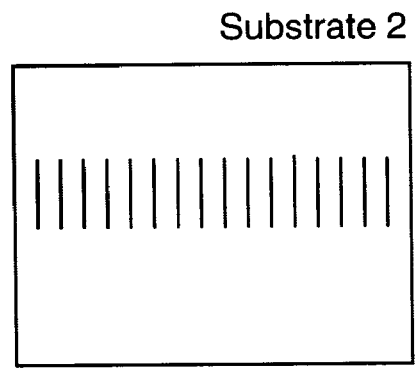
FIG. 25F Substrate 2
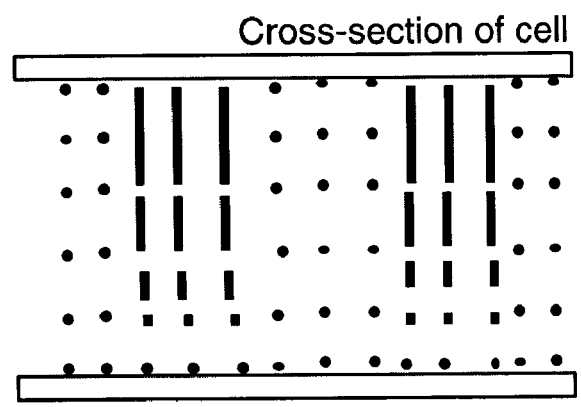
FIG. 25G Cross-section of cell alignment amplitude polarization exposure Parallel linear Substrate 1

Substrate 2

Cross-section of cell alignment alignment amplitude amplitude polarization polarization exposure Linear polarized
blanket exposure exposure Parallel linear (+/−45°)

Substrate 1

Substrate 2

Cross-section of cell

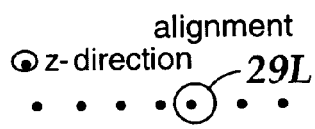
FIG. 29A
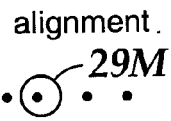
FIG. 29E
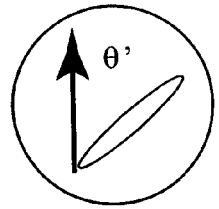
FIG. 29M
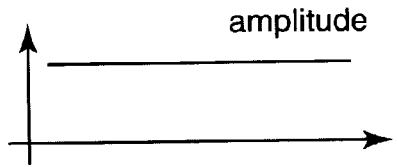
FIG. 29B
FIG. 29L
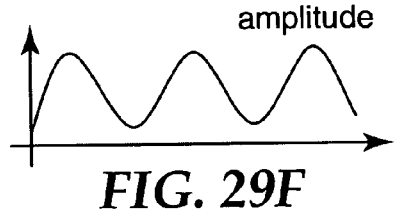
FIG. 29F
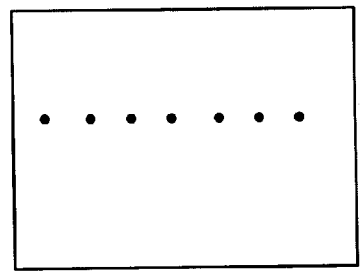
FIG. 29I
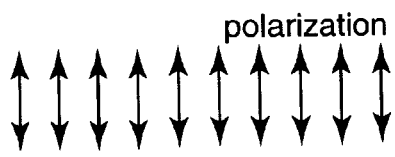
FIG. 29C
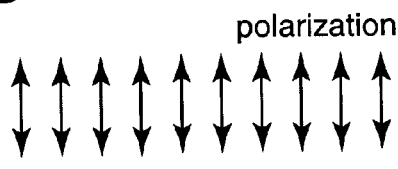
FIG. 29G
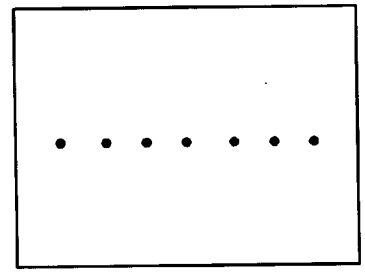
FIG. 29J
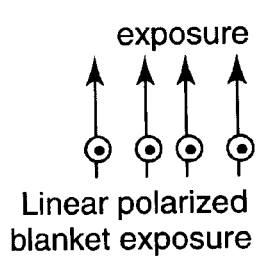
FIG. 29D
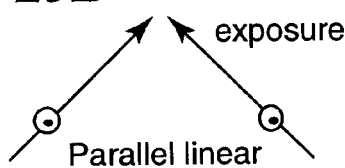
FIG. 29H
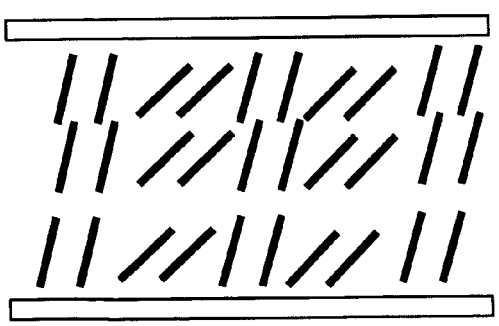
FIG. 29K

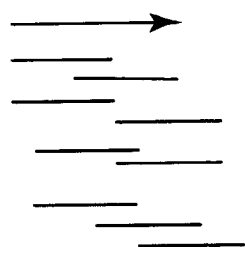
Rubbing direction
alignment
FIG. 30A
alignment
FIG. 30B
amplitude
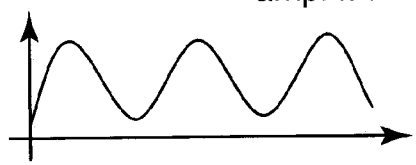
FIG. 30C
polarization
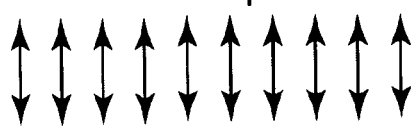
FIG. 30D
exposure
Parallel linear
FIG. 30E
Substrate 1
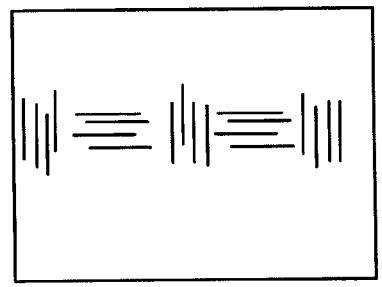
FIG. 30F
Substrate 2
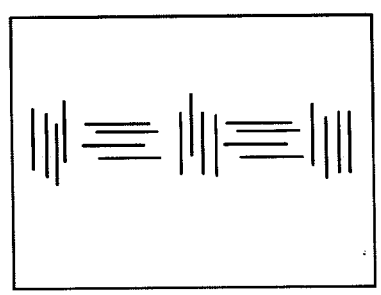
FIG. 30G
Cross-section of cell
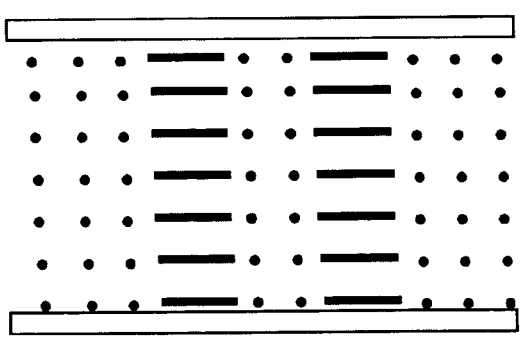
FIG. 30H

METHOD OF ALIGNMENT OF LIQUID CRYSTALS COMPRISING EXPOSING AN ALIGNMENT MATERIAL TO AN INTERFERENCE PATTERN

BACKGROUND

This invention relates to alignment of liquid crystals (LCs), and more particularly to liquid crystal photoalignment.

LCs include liquids in which an ordered arrangement of molecules exists. Typically, LC molecules are anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties.

As a result of the rodlike or disklike nature, the distribution of the orientation of LC molecules typically plays an important role in optical applications, such as in liquid crystal displays (LCDs). In these applications, LC alignment is dictated by an alignment surface. The alignment surface is usually treated so that the LC aligns relative to the surface in a predictable and controllable way. In many cases, the role of the alignment surface is to ensure a single domain through the LC device. In the absence of a treated alignment surface, the LC will typically have many domains and many disclinations, or discontinuities in orientation. In optical applications, these domains and discontinuities can cause scattering of light, leading to a degradation in the performance of the display.

In many LCDs, the alignment surfaces provide homogeneous alignment of the LC at the surface. Such an alignment surface may be provided by rubbing a polymer, such as a polyimide, in a direction parallel to the desired alignment direction. Rubbing may be performed using a cloth, such as a felt or velvet fabric. It is generally believed that rubbing a polymer surface produces a uniform and unidirectional tilt of dangling bonds or polymer chains on the surface. The unidirectional tilt of these surface molecules may lead to the parallel homogeneous alignment of the LC molecules.

SUMMARY

In general, in a first aspect, the invention features a method, including exposing an alignment material to an interference pattern to cause a chemical reaction in the alignment material, and exposing the alignment material to a liquid crystal, wherein the liquid crystal aligns relative to the alignment material based on the interference pattern.

Embodiments of the method can include one or more of the following features and/or features of other aspects.

The chemical reaction can cause polymerization or depolymerization in the alignment material. The chemical reaction can include a photochemical reaction. A surface of the alignment material can be exposed to the interference pattern. The surface can be substantially planar or curved. For example, the surface can be an inner-surface of a tube (e.g., a glass tube or a polymer tube).

The alignment material can be disposed on a surface of a substrate comprising a substrate material (e.g., a glass, polymer, or semi-conductor such as silicon). The substrate material can be flexible.

The substrate can include an electrode layer. The electrode layer can include a transparent electrically conductive material, such as a metal oxide, e.g. indium tin oxide. The substrate can include a thin film transistor. The substrate can include a metal.

The liquid crystal can permeate the alignment material. The alignment material can include a liquid crystal.

In some embodiments, the alignment material includes a polymer. The polymer can include a cinnamate group and/or a silane. The polymer can be a polyimide.

The interference pattern can be formed from two or more optical beams which originate from the same source. The optical beams can include UV radiation. In some embodiments, the interference pattern can be formed from two or more electron beams.

The interference pattern can include regions of high intensity and regions of low intensity. The liquid crystal can align relative to the alignment material based on the intensity of the interference pattern. In some embodiments, the liquid crystal aligns substantially homeotropically or homogeneously where the alignment material is exposed to regions of high intensity. Alternatively, or additionally, the liquid crystal can align substantially homeotropically or homogeneously where the alignment material is exposed to regions of low intensity.

The interference pattern can include regions of different polarization. For example, the interference pattern can include regions of different linear polarization and/or regions of elliptical polarization. The liquid crystal can align relative to the alignment material based on the polarization of the interference pattern. For example, the liquid crystal can align substantially perpendicular or substantially parallel to the direction of polarization of the interference pattern.

At least a portion of the liquid crystal can align substantially homeotropically relative a surface of the alignment material. At least another portion of the liquid crystal can align substantially homogeneously relative to the surface of the alignment material. Alternatively, or additionally, at least a portion of the liquid crystal can align obliquely relative a surface of the alignment material. In some embodiments, at least a portion of the liquid crystal aligns substantially homogeneously relative to a surface of the alignment material.

The interference pattern can be formed by overlapping two or more beams. Two of the beams can have similar polarization states. For example, the two beams can have substantially parallel linear polarization states. In some embodiments, two of the beams can have different polarization states. For example, the two beams can have opposite circular polarization states. One of the two beams can have a linear polarization state and the other can have a circular polarization state. In some embodiments, the interference pattern can be formed by overlapping three or more beams and at least two of the beams have similar polarization states. The liquid crystal can be disposed on the surface prior or after exposure to the interference pattern.

The liquid crystal can have a nematic phase, a chiral nematic phase, a smectic phase, and/or a ferroelectric phase. The method can further include rubbing a surface of the alignment material prior to exposing the alignment material to the interference pattern. Alternatively, or additionally, the method can further include exposing a surface of the alignment material to polarized radiation (e.g., UV radiation) prior to (or after) exposing the alignment material to the interference pattern.

In another aspect, an embodiment of the invention features a method that includes exposing an alignment material to radiation and exposing the alignment material to a liquid crystal. In this embodiment, different portions of the alignment material are simultaneously exposed to different polarization states of the radiation and the liquid crystal aligns relative to the alignment material based on the polarization state of the radiation.

Embodiments of the method can include one or more of the following features and/or features of other aspects.

The polarization state of the radiation can vary continuously across the alignment material. The radiation can cause polymerization, depolymerization, or isomerization in the alignment material.

In a further aspect, the invention features a method that includes exposing an alignment material to polarized radiation and exposing the alignment material to a liquid crystal, where the polarization state of the radiation varies continuously across a portion of the alignment material and the liquid crystal aligns relative to the alignment material based on the polarization state of the radiation.

Embodiments of the method can include one or more features of other aspects.

In another aspect, the invention features a method that includes exposing a curved surface comprising an alignment material to polarized radiation and disposing a liquid crystal on the curved surface, where the liquid crystal aligns substantially parallel to an alignment direction related to the polarized radiation.

Embodiments of the method can include one or more of the following features and/or features of other aspects.

The alignment direction can be related to the polarization state of the polarized radiation. For example, the alignment direction can be substantially parallel or substantially orthogonal to the polarization direction of the polarized radiation.

The curved surface can be a cylindrical surface. The cylindrical surface can be an inner surface of a cylindrical tube (e.g., a glass, polymer tube, or hollow core fiber).

In yet another aspect, the invention features an article that includes a cylindrical cladding having an axis, a core surrounding the cladding comprising a liquid crystal, wherein the liquid crystal is aligned substantially parallel to an alignment direction that is uniform through a cross-section of the cylindrical cladding.

Embodiments of the article can include one or more of the following features and/or features of other aspects.

The alignment direction can be non-parallel to the axis of the cylindrical cladding. For example, the alignment direction can be substantially orthogonal to the axis of the cylindrical cladding.

The cylindrical cladding can include an alignment material. The alignment material can be a photosensitive alignment material.

In another aspect, the invention features an optical waveguide including the article.

In another aspect, the invention features a method that includes overlapping at least three beams to form an interference pattern, where the beams originate from the same source, exposing an alignment material to the interference pattern, and exposing the alignment material to a liquid crystal, where the liquid crystal aligns relative to the alignment material based on the interference pattern.

Embodiments of the method can include one or more of the following features and/or features of other aspects.

The interference pattern can cause polymerization, depolymerization, or isomerization in the alignment material.

Embodiments of the invention may include one or more of the following advantages.

Most of the alignment methods disclosed herein are non-contact methods, which reduce exposure of the alignment surface to debris and other contaminants that can adversely affect the performance of an LC device. Complex alignment patterns can be produced in a single exposure step, as opposed to multiple or scanned exposures. Furthermore, the methods may be used with commercially available materials and light sources. Other complex alignment patterns can be further produced in a limited number of steps by combining this method with conventional alignment techniques or with multiple exposures of this method.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1B is a plan view of the optical cell.

FIG. 2A is a schematic diagram indicating relative polarization states of interfering beams for one exposure configuration.

FIG. 2B is a plot showing relative intensity and the in-plane LC alignment as a function of a spatial co-ordinate for the relative polarization states shown in FIG. 2A.

FIG. 3A is a schematic diagram indicating relative polarization states of interfering beams for another exposure configuration.

FIG. 3B is a plot showing relative polarization of an interference pattern and the in-plane LC alignment as a function of a spatial co-ordinate for the relative polarization states shown in FIG. 3A.

FIG. 4A is a schematic diagram indicating relative polarization states of interfering beams for a further exposure configuration.

FIG. 4B is a plot showing relative polarization of an interference pattern and the in-plane LC alignment as a function of a spatial co-ordinate for the relative polarization states shown in FIG. 2A.

FIG. 12A–12G are schematic diagrams illustrating the formation and structure of an example of an optical cell preparing using photoalignment. In FIG. 12B, "amplitude" refers to the intensity of the interference pattern.

In FIG. 13B, "amplitude" refers to the intensity of the interference pattern.

FIG. 14A–14G are schematic diagrams illustrating the formation and structure of an example of an optical cell preparing using photoalignment. In FIG. 14B, "amplitude" refers to the intensity of the interference pattern.

In FIG. 15B, "amplitude" refers to the intensity of the interference pattern.

FIG. 16A–16G are schematic diagrams illustrating the formation and structure of an example of an optical cell preparing using photoalignment. In FIG. 16B, "amplitude" refers to the intensity of the interference pattern.

FIG. 17A–17G are schematic diagrams illustrating the formation and structure of an example of an optical cell preparing using photoalignment. In FIG. 17B, "amplitude" refers to the intensity of the interference pattern.

FIG. 18A–18G are schematic diagrams illustrating the formation and structure of an example of an optical cell preparing using photoalignment. In FIG. 18B, "amplitude" refers to the intensity of the interference pattern.

In FIG. 19B, "amplitude" refers to the intensity of the interference pattern.

In FIG. 20B, "amplitude" refers to the intensity of the interference pattern.

FIG. 21A–21G are schematic diagrams illustrating the formation and structure of an example of an optical cell preparing using photoalignment. In FIG. 21B, "amplitude" refers to the intensity of the interference pattern.

FIG. 22A–22G are schematic diagrams illustrating the formation and structure of an example of an optical cell preparing using photoalignment. In FIG. 22B, "amplitude" refers to the intensity of the interference pattern.

FIG. 23A–23H are schematic diagrams illustrating the formation and structure of an example of an optical cell preparing using photoalignment. In FIG. 23B, "amplitude" refers to the intensity of the interference pattern.

In FIG. 24B, "amplitude" refers to the intensity of the interference pattern.

FIG. 25A–25G are schematic diagrams illustrating the formation and structure of an example of an optical cell preparing using photoalignment. In FIG. 25B, "amplitude" refers to the intensity of the interference pattern.

In FIG. 26B, "amplitude" refers to the intensity of the interference pattern.

In FIG. 27B, "amplitude" refers to the intensity of the interference pattern.

FIG. 28A–28K are schematic diagrams illustrating the formation and structure of an example of an optical cell preparing using photoalignment. In FIG. 28B, "amplitude" refers to the intensity of the interference pattern.

FIG. 29A–29M are schematic diagrams illustrating the formation and structure of an example of an optical cell preparing using photoalignment. In FIGS. 29B and 29F, "amplitude" refers to the intensity of the interference pattern.

FIG. 30A–30H are schematic diagrams illustrating the formation and structure of an example of an optical cell preparing using photoalignment. In FIG. 30C, "amplitude" refers to the intensity of the interference pattern.

In FIG. 31B, "amplitude" refers to the intensity of the interference pattern.

Like reference symbols in the various drawings indicate like elements.

DETAILED DESCRIPTION

Figure 1A:
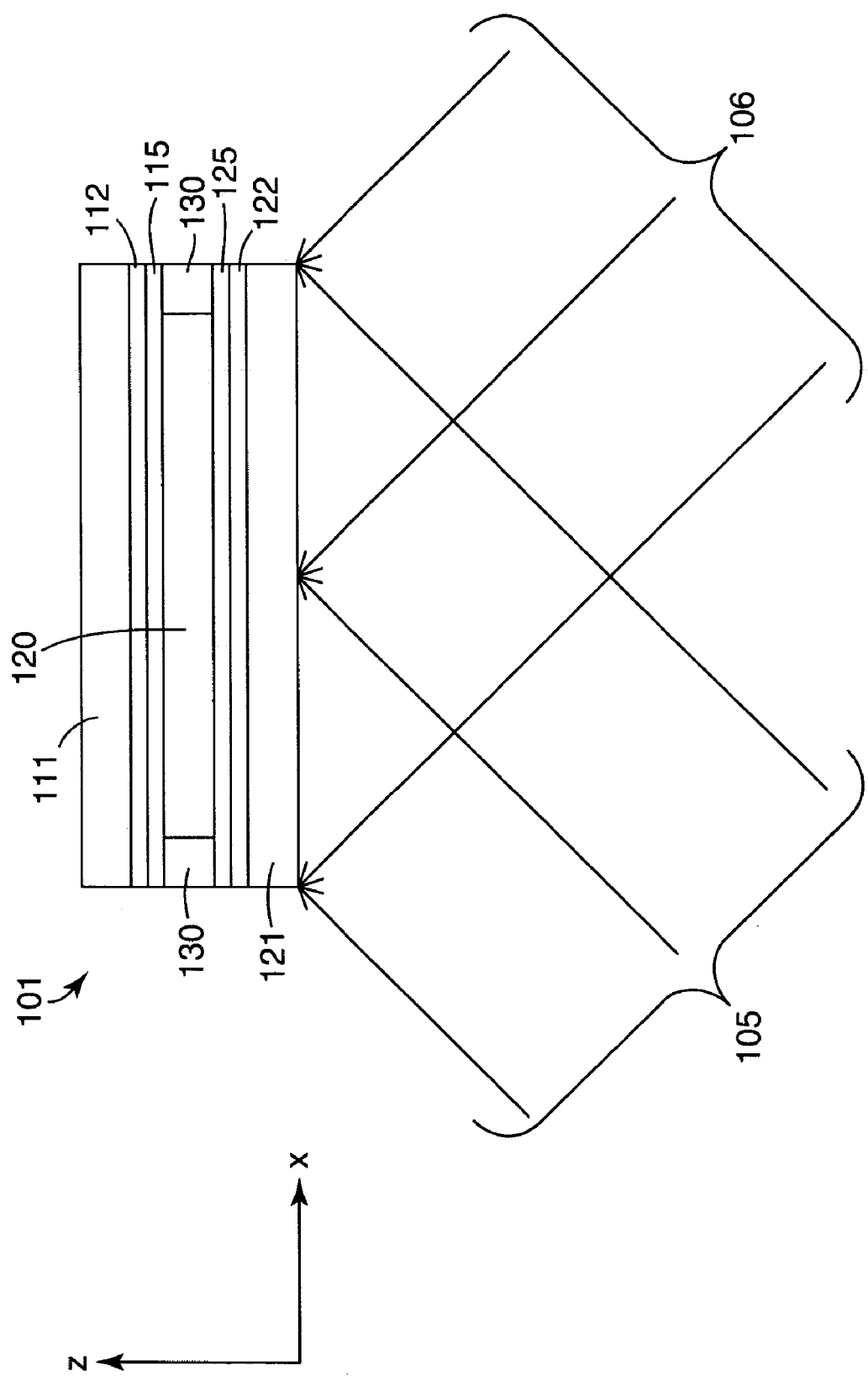
FIG. 1A is a cross-sectional view of an optical cell during exposure to an interference pattern.

Referring to FIGS. 1A and 1B, an optical cell 101 includes a chamber 120 bound on either side by glass substrates 111 and 121. The chamber is sealed by an epoxy edge seal 130, which bonds the glass substrates to each other. Metal oxide (e.g., indium tin oxide) electrode layers 112 and 122 are disposed on the inner surface of substrates 111 and 121, respectively, while polymeric alignment layers 115 and 125 are disposed on electrode layers 112 and 122, respectively.

Prior to filling and sealing chamber 120 with a nematic liquid crystal (LC), alignment layers 115 and 125 are simultaneously exposed to an interference pattern formed by overlapping beams 105 and 106. Beams 105 and 106 are linearly polarized ultraviolet (UV) beams. For linearly polarized radiation the orientation of the electric field is constant, although its magnitude and sign can vary in time. The electric fields in beams 105 and 106 are similarly oriented. For example, both beams can be s-polarized (i.e., having co-planar electric field vectors) or both beams can be p-polarized (i.e., having parallel electric fields). The beams are also coherent and form an interference pattern in the overlapping region. The interference pattern includes fringes of relatively high intensity 150 and relatively low intensity 160, but the radiation in each fringe has a similar polarization state. Cartesian axes are provided for reference and are referred to below.

The UV light causes polymerization in the alignment material. Subsequently, LC disposed on the irradiated surface aligns substantially parallel to the orientation of the electric field of the radiation forming the interference pattern. Without wishing to be bound by theory, it is believed that polymerization occurs in an anisotropic fashion due to the anisotropic electric field distribution of the radiation in the interference pattern. The resulting anisotropy in the polymer alignment material is sufficient to align an LC disposed on the surface.

The resulting modulation in LC alignment manifests in the optical properties of the cell. In particular, for at least one incident polarization state the cell has a modulated index of refraction in the x-direction. Thus, when illuminated with polarized light, the cell operates as a diffraction grating with a grating period corresponding to the fringe period in the interference pattern. This period depends on the geometry of the beams (i.e., their relative wavevectors) and the beams' wavelength. The fringe period can be determined from mathematical models disclosed in, e.g., "Principles of Optics," written by Max Born and Emil Wolf (6$^{th}$ (corrected) Edition, Cambridge University Press, Cambridge, UK (1997)).

A number of photopolymerizable polymers may be used for the alignment layers. In addition to being photopolymerizable, these materials should preferably be inert with respect to the LC, should provide stable alignment over a range of operating temperatures of the LC device (e.g., from about −50° C. to about 100° C.), and should be compatible with methods used in manufacturing the device. Examples of photopolymerizable polymers include polyimides (e.g., AL 1254 commercially available from JSR Micro, Inc (Sunnyvale, Calif.)), Nissan RN-1199 available from Brewer Science, Inc. (Rolla, Mo.), and cinnamates (e.g., polyvinyl 4-methoxy-cinnamate as described by M. Schadt et al., in "Surface-Induced Parallel Alignment of Liquid Crystals by Linearly Polymerized Photopolymers," *Jpn. J. Appl. Phys.*, Vol. 31 (1992), pp. 2155–2164). Another example of a photopolymerizable polymer is Staralign™, commercially available from Vantico Inc. (Los Angeles, Calif.). Further examples include chalcone-epoxy materials, such as those disclosed by Dong Hoon Choi and co-workers in "Photo-alignment of Low-molecular Mass Nematic Liquid Crystals on Photochemically Bifunctional Chalcone-epoxy Film by Irradiation of a Linearly Polarized UV," *Bull. Korean Chem. Soc.*, Vol. 23, No. 4 587 (2002), and coumarin side chain polyimides, such as those disclosed by M. Ree and co-workers in "Alignment behavior of liquid-crystals on thin films of photosensitive polymers —Effects of photoreactive group and UV-exposure," *Synth. Met.*, Vol. 117(1–3), pp. 273–5 (2001) (with these materials, the LC aligns nearly perpendicularly to the direction of polarization).

The rate of polymerization in the alignment material depends on the wavelength of radiation and the local intensity of the interference pattern. Typically, polymerization rates are highest where the intensity of the interference fringes is highest. In fringes of low intensity (e.g., substantially zero intensity), the polymerization rates are comparatively low and the alignment material may provide little or no alignment change due to the exposure for the LC. Accordingly, exposure of the alignment layer to the interference pattern provides modulated alignment in the LC, where regions of the alignment layer exposed to high intensity fringes result in strongly aligned LC, while other regions exposed to low intensity fringes provide little or no alignment change of the LC.

This effect is illustrated in FIGS. 2A and 2B. As discussed previously, for linearly polarized beams with parallel electric field vectors, the interference pattern includes a series of intensity fringes. Referring specifically to FIG. 2B, the intensity, A, of such an interference pattern is plotted as a function of the spatial coordinate, x. The resulting LC orientation is also indicated along the x-axis. In this and other figures, LC orientation is shown as a series of lines that indicate the direction of the molecular director, which is related to the average local orientation of the symmetry axis of the LC molecules. In regions exposed to high intensity fringes, the LC is uniformly aligned as indicated by numerals 210, 212, and 214. However, in regions exposed to the low intensity fringes, the LC is randomly aligned as indicated by numerals 211 and 213. Note that the LC orientation is indicated for the plane of the alignment surface.

In general, fringe contrast of the interference pattern can vary as desired provided the interference pattern provides the desired modulation of LC orientation. Where there is a threshold exposure for providing LC alignment, the fringe contrast should be sufficiently high so that regions of the alignment material exposed to high intensity fringes receive an above threshold amount of radiation, while regions exposed to low intensity fringes are below threshold. The exposure threshold usually depends on the specific alignment material and on the LC. Typically, the fringe contrast is sufficiently high so that minimum fringe intensity is less than about 75% of the maximum fringe intensity (e.g., less than about 50%). In some embodiments, the fringes can be high contrast and the minimum fringe intensity is less than about 10% of the maximum fringe intensity, such as about 5% or less.

Referring to FIGS. 3A and 3B, in some embodiments, the beams can be circularly polarized rather than linearly polarized. Where the beams are circularly polarized with opposite handedness, as indicated in FIG. 3A, the interference pattern has a continuously varying linear polarization state across a spatial dimension. This type of interference pattern is referred to as a polarization grating since the polarization varies and the intensity remains constant, and is illustrated in FIG. 3B. Also illustrated in FIG. 3B is the resulting LC alignment. The LC orientation corresponds to the orientation of the electric field vector in the interference pattern, varying continuously across the cell.

In general, the relative polarization states of the two beams can include other configurations in addition to those described previously. For example, referring to FIGS. 4A and 4B, the beams may have orthogonal linear polarization states. As indicated in FIG. 4A, in this situation, the beams are both linearly polarized, but the polarization vectors are orthogonally oriented. The resulting interference pattern has a continuously varying polarization ellipticity across a spatial dimension with the intensity across the film remaining constant. This type of interference pattern is illustrated in FIG. 4B. Where the interference pattern has a linear or highly eccentric elliptical polarization state, the LC is expected to orient relative to (e.g., parallel to) the major elliptical axis. However, where the interference pattern is circularly polarized, the LC is expected have no preferred surface orientation direction. In this situation the LC typically orients based on the elastic energy of the LC.

In the foregoing examples, the LC aligns homogeneously (i.e., parallel to the x-y plane). However, in other embodiments the LC can align with a pretilt with respect to the x-y plane or homeotropically. Pretilt may occur where the electric field of the exposing radiation is at a non-zero angle, defined by the angle of incidence of the interfering beams, with respect to the alignment layer surface. The pretilt angle can also depends on the composition of the alignment material, which may be selected to provide a desired pretilt angle for a specific application. Examples of materials that provide homeotropic alignment are discussed below.

The LC can be selected based on its birefringence, elastic constants, dielectric anisotropy, and/or thermodynamic properties. For example, the LC can be selected to have a high birefringence (e.g., greater than about 0.1) or to maintain the nematic phase over a wide temperature range (e.g., from about −50° C. to about 100° C.). Examples of nematic LCs include certain biphenyl compounds, such as certain cyanobiphenyls (e.g., 5CB and 6CB). Many commercially available LCs are mixtures of multiple compounds (e.g., eutectic mixtures). These include BL038, and ZLI-1565, commercially available from EM Industries (Hawthorne, N.Y.), and LC NIXOM 2101, commercially available from Chisso Petrochemical Corporation (Ichihara-shi, Japan). In some embodiments, the LC may exhibit other LC phases in addition or alternatively to the nematic phase. For example, the LC can have chiral nematic and/or smectic (e.g., ferroelectric) phases. Examples of chiral nematic LCs include Merck MLC-6054 (commercially available from EM Industries (Hawthorne, N.Y.)). Examples of smectic LCs include K24 (8CB), K27 (9CB), K30 (10CB), K33 (11CB) and K36 (12CB), all available from EM Industries. Examples of ferroelectric LCs include Merck ZLI-4851 (commercially available from EM Industries (Hawthorne, N.Y.)) and FELIX M4654/100 (commercially available from Clariant Corporation (Charlotte, N.C.)).

Although alignment layers 115 and 125 include a material which polymerizes when illuminated with UV radiation, in general, materials can be used which react differently to the radiation to provide LC alignment. Radiation can be used to induce other types of chemical reaction in the alignment material. For example, in some embodiments, the radiation can cause depolymerization or bond breaking in the alignment material. Depolymerization can occur in polymer chains having a chromophore oriented parallel to the electric field of linearly polarized radiation where the radiation is sufficiently energetic. The LC aligns perpendicular to the orientation of the electric field. Examples of materials that can be depolymerized using radiation include polyimides (e.g., AL 1254 commercially available from JSR Micro, and Nissan RN-1199 available from Brewer Science, Inc. (Rolla, Mo.)). In many cases, short wavelength UV may be used for photo depolymerization alignment of LCs (e.g., wavelengths less than about 300 nm, such as about 260 nm or less).

In some embodiments, unexposed or weakly exposed regions of alignment material can homeotropically align LC, while those regions exposed to high intensity fringes align the LC with a pretilt or in the x-y plane. For example, silane compounds (e.g., octadecyltriethoxysilane (OTE) self-assembled monolayers (SAMs) commercially available from Aldrich, (Milwaukee, Wis.) can align LCs compounds can decompose, losing their ability to align the LC. Accordingly, in regions exposed to high intensity UV fringes, alignment is no longer homeotropic (e.g., planar homogeneous), whereas those regions exposed to low intensity UV retain homeotropic alignment. (See, e.g., B. Lee and N. Clark, "Alignment of Liquid Crystals with Patterned Isotropic Surfaces," *Science*, Vol. 291 (2001), p. 2576.)

In some embodiments, the radiation can cause a physical change in the alignment material without causing a chemical reaction. For example, the radiation can cause photoisomerization in the alignment material. Photoisomerization refers to a change in a bond orientation in a molecule of the alignment material due to exposure to radiation. Diazodiamine dyes, for example, can change between cis and trans isomers when exposed to radiation of a suitable wavelength. Where one isomer is formed in the alignment material in a preferential direction by exposure to polarized radiation, an LC in contact with the alignment material can adopt an alignment related to the orientation of the polarization. An example of such a material is a silicone polyimide copolymer doped with a diazodiamine dye. Once exposed to linearly polarized light of an appropriate wavelength, the copolymer aligns a nematic LC orthogonally to the direction of the electric field vector of the exposing radiation (see, e.g., W. M. Gibbons, et al., "Surface-mediated alignment of nematic liquid crystals with polarized laser light," *Nature*, Vol. 351 (1991), pp. 49–50.)

Although beams 105 and 106 are UV beams, depending on the alignment material, other wavelengths can be used to provide photoalignment. UV wavelengths are those between about 100 nm and 380 nm. In some embodiments, visible wavelengths can be used (e.g., wavelengths between about 380 nm and 780 nm). Generally, the beam wavelength is selected to provide the desired effect in the material. For example, where the alignment material is a photoisomerizable polymer (e.g., an azo-doped polyimide), the wavelength can be selected to provide energy at the absorption band of the dye (e.g., from about 450 nm to about 550 nm, such as at 514 nm). In some embodiments, alignment can be induced by exposure to interference patterns formed from non electromagnetic radiation, such as electron beam interference patterns.

Any source that provides radiation at the desired wavelength and is sufficiently coherent can be used to form the interference pattern. Typically, the source is a laser, such as a gas laser, an eximer laser or a solid state laser. The type of laser is typically selected based on the alignment material (or vice versa) so that the laser supplies radiation at a wavelength that induces the desired physical change in the alignment material. For example, for a polyvinyl cinnamate one might select an Argon Ion laser, which can provide radiation at 351 nm appropriate for this material. However, for depolymerization-type alignment, one may select a laser that provides shorter wavelength radiation (e.g., an eximer laser to provide radiation at 248 nm), sufficient to break chemical bonds in the alignment material.

The alignment material can be deposited on the electrode layer using any of a variety of techniques. These techniques include coating methods, such as spin coating, knife coating, bar coating, gravure coating, dip coating, spray coating or die coating. The alignment material can be coated out of a solvent, such as water or an organic solvent (e.g., alcohol, acetone, toluene, methylethylketone, N-methyl pyrolidinone, and butyrolactone). In some embodiments, the alignment material can be deposited on the substrate using other methods, such as by lamination, buffing, or ink jetting.

Cell thickness may vary as desired. Cell thickness is typically selected based on the application. For example, in applications demanding greater optical retardation from the LC layer, a thicker cell may be used. Alternatively, where, for example, a fast response time or small amount of retardation is desired, the cell may be comparatively thin. Typical cell thickness is in the range of about one to ten micrometers (e.g., about two, three, five micrometers or more). However, in some cases cells can be substantially thicker than this (e.g., more than about 20 micrometers, 30 micrometers, 50 micrometers). Spacers (e.g., fiber cylinders of uniform diameter) may be included between the substrates to maintain the cell gap.

During operation of an LC device incorporating cell 101, the device can be switched between different optical states by applying a voltage between electrode layers 112 and 122. Due to the dielectric anisotropy of the LC material, the electric field generated by the applied voltage causes an orientation change in the LC, which typically results in a change in the optical properties of the cell. Devices which can be switched between different states are referred to as "active" devices.

As discussed previously, the electrode layers can be formed from indium tin oxide (ITO). ITO is a conductor that is transparent at optical wavelengths. In other embodiments, the electrodes can be formed from conducting materials other that ITO. In some cases, one of the electrodes can be formed from a material that is opaque at the cell's wavelength(s) of operation. For example, where cell 101 is to operate as part of a reflective device, an electrode can include a reflective material, such as a reflective metal (e.g., silver or aluminum).

The electrode layers can include a single electrode or can be divided into multiple electrodes to provide a pixellated device. Where the electrode layers include multiple electrodes, the pitch of the interference pattern can be greater than, less than, or equal to the electrode pitch. Where the interference pattern period pitch is less than the electrode pitch, the alignment procedure can provide a multi-domain device, which refers to a device that includes portions of varying alignment in one pixel.

In some embodiments, the electrode layers can include a nonlinear element, such as a semiconductor element. For example, an electrode layer can include a thin-film transistor (TFT) or semiconductor diode.

While the foregoing description relates to cells for incorporating in active devices, the alignment techniques disclosed herein can also be used in so-called "passive" devices or devices which change their optical properties in response to some stimuli other than an electric field (e.g., thermal, mechanical, and/or chemical stimuli). Passive devices refer to those that do not change their optical characteristics during operation. Examples of passive devices include non-switchable gratings and other diffractive elements.

Although the substrates are glass in the foregoing embodiment, more generally the substrates can be formed from any material. Preferably, at least one of the substrates should be transparent for wavelengths at which the optical cell is to be operated. In some embodiments, the substrates can be formed from a flexible material, such as certain polymers (e.g., polycarbonate, polyethylterephthalate, polyethersulphone, polynorbornene, and polyethylene).

In some cases, such as where the cell is to operate in a reflective device, at least one of the substrates can be formed from an opaque material. For example, the opaque material can be a metal or a semiconductor, such as silicon (e.g., amorphous, polycrystalline, or crystalline silicon).

In some embodiments, alignment material can extend through chamber 120, rather than being confined to thin layers on the substrate surfaces. For example, the alignment material can form a polymer network that extends through the chamber and is permeated by the LC once the chamber is filled. Alternatively, the cell can include an LC dispersion where one of the dispersion phases includes the alignment material. Examples of dispersions are polymer dispersed liquid crystals (PDLCs). A PDLC is a dispersion of LC droplets distributed throughout a polymer matrix. Where the polymer matrix material includes a suitable photosensitive compound, exposure to an interference pattern could align LC is droplets exposed to, e.g., high intensity fringes in a preferred direction, while LC in other droplets remains randomly aligned from droplet to droplet.

The LC can be a polymer LC (e.g., a main chain or side chain polymer LC). Examples of polymer LCs include reactive mesogens, such as those described by H. S. Kitzerow in Chapter 8 of "Liquid Crystals in Complex Geometries: Formed Polymer and Porous Networks," edited by G. P. Crawford and S. Zumer, Taylor & Francis (1996). In some embodiments, the polymer LC can include a photosensitive group that causes a preferred alignment of the LC upon exposure to polarized radiation, often by a cis-trans photoisomerization. Photoaligned polymer LC cells can form the basis of passive devices.

Exposing both substrates 111 and 121 simultaneously ensures that the fringes of the interference pattern are registered with respect to each substrate. Accordingly, in embodiments where the alignment material on each substrate provides the same alignment, the layers align the LC symmetrically with respect to a plane parallel to the substrate surfaces in the center of cell 101. In other embodiments, substrates may be exposed prior to assembling the cell. In such cases, cells can be formed with non-symmetric alignment. For example, cells can be formed that provide twisted alignment (e.g., patterned TN cells).

Combinations of additional alignment steps can be used to provide the desired alignment pattern. For example, one or both of the alignment layers can be subject to buffing and/or additional exposures before or after exposure to the interference pattern.

Figure 5A:
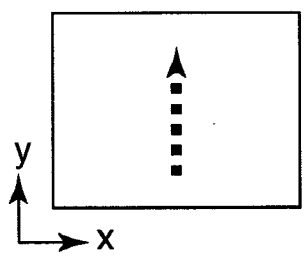
FIG. 5A shows LC alignment after a first step in a two-step alignment process.
Figure 5B:
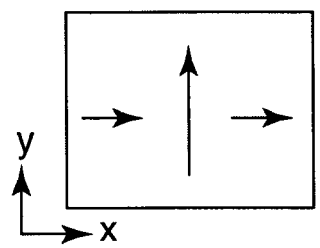
FIG. 5B shows LC alignment after a second step in the two-step alignment process.
Figure 5C:
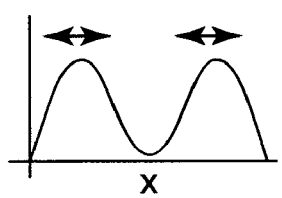
FIG. 5C shows the relative intensity and polarization of an interference pattern used in the second step of the two-step alignment process.

In some implementations, the alignment material is rubbed in a first direction prior to exposing to the interference pattern. For example, referring to FIG. 5A–5C, an alignment material such as a polyimide is rubbed in the y-direction in a first step (FIG. 5A). Subsequently, the alignment material, which is on top of the polyimide, is exposed to the interference pattern (e.g., having parallel linear polarization), in which the electric field is oriented to cause LC to align along the x-direction in regions exposed to the high intensity fringes. The alignment pattern of the LC after step 2 is illustrated in FIG. 5B, which corresponds to exposure to the fringe pattern shown in FIG. 5C for the second step.

As an alternative to the initial rubbing step, the alignment material can be exposed to a blanket linearly polarized UV exposure (i.e., an exposure without the modulation provided by the interference pattern), which causes alignment along the y-direction. The second exposure then causes a dominating anisotropy in the orthogonal direction so that LC adjacent regions exposed to certain fringes aligns along the x-direction. Of course, the different regions need not be orthogonally aligned—other relative alignment directions may be formed.

Figure 6A:
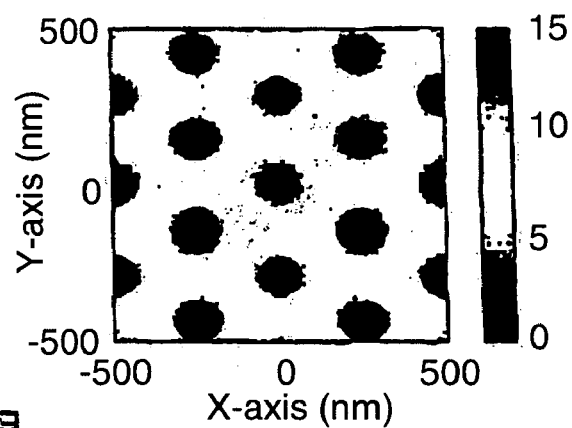
FIGS. 6A and 6B are plots of relative intensity in a three-beam interference pattern and the corresponding LC alignment pattern, respectively.
Figure 6B:
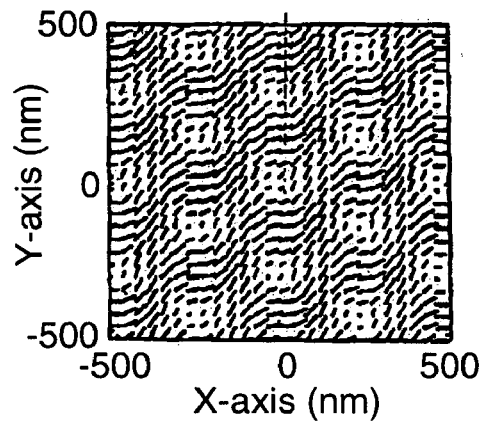

Interference patterns formed from more than two beams can be used to provide more complex alignment patterns. For example, referring to FIGS. 6A and 6B, a three-beam interference pattern provides an alignment pattern that is modulated along both the x-axis and the y-axis. FIG. 6A shows a plot of relative interference fringe intensity in the x-y plane. FIG. 6B shows the corresponding LC alignment pattern for these interference fringes. In general, any number of beams can be used to provide a desired interference pattern. beam interference pattern provides an alignment pattern that is modulated along both the x-axis and the y-axis. FIG. 6A shows a plot of relative interference fringe intensity in the x-y plane. FIG. 6B shows the corresponding LC alignment pattern for these interference fringes. In general, any number of beams can be used to provide a desired interference pattern.

In the foregoing discussion, it is assumed that the interference patterns are formed by beams whose wavefronts are plane waves, giving rise to periodic fringe patterns. However, non-plane wave illumination can also be used, giving rise to complex, non-periodic interference patterns.

Figure 7A:
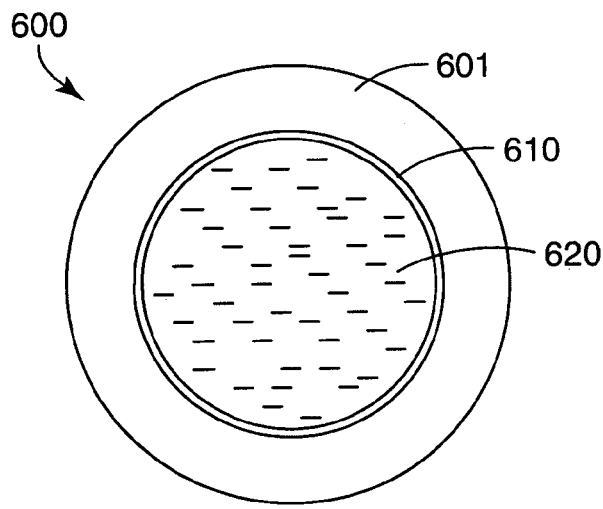
FIG. 7A is a cross-sectional view of a cylindrical LC waveguide.
Figure 7B:
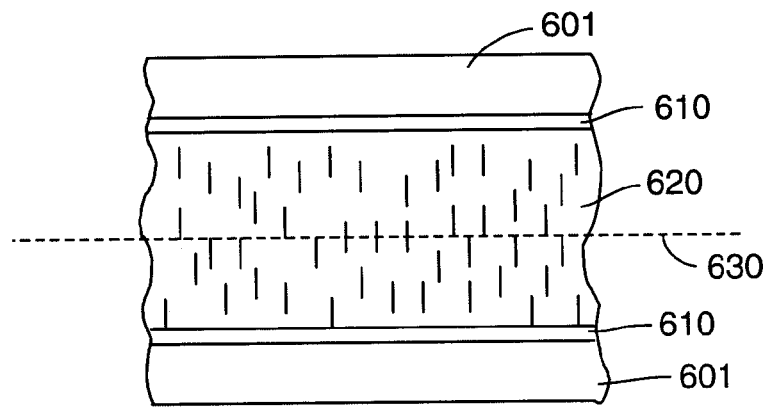
FIG. 7B is a plan view of a portion of the cylindrical LC waveguide for a first alignment configuration.
Figure 7C:
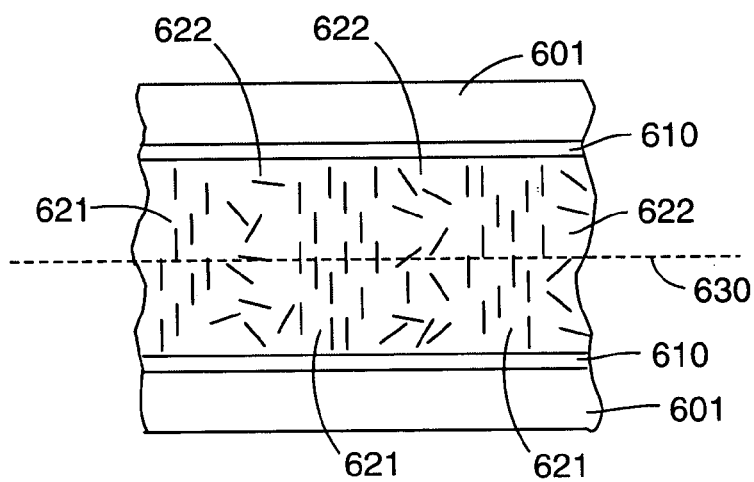
FIG. 7C is a plan view of a portion of the cylindrical LC waveguide for a second alignment configuration.

While cell 101 is a planar cell, the alignment techniques disclosed herein can be applied to other form factors. For example, curved substrates can also be used. Referring to FIG. 7A–7C, an example of a curved substrate is a cylindrical substrate, such as a surface of a glass capillary tube 601. Capillary tube 601 forms a cladding of a cylindrical waveguide 600, which guides electromagnetic radiation (e.g., optical or infrared radiation) along a waveguide axis 630. The inner surface of tube 601 is covered by a layer 610 of an alignment material. Upon exposure to polarized light, the alignment material homogeneously aligns an LC in core 620. The polarized light can be in the form of a blanket exposure or an interference pattern. For a linearly polarized blanket exposure, the LC aligns homogeneously through the entire region exposed to the radiation (as shown in FIG. 7B).

However, where the exposure is in the form of an interference pattern, the alignment is modulated.

Referring specifically to FIG. 7C, for example, in regions 621 exposed to high intensity fringes, LC alignment is homogeneous. However, in regions 622 exposed to low intensity fringes, LC alignment is unchanged, not significantly reoriented. Alternatively, for other alignment materials, the homogeneous alignment regions may correspond to the low intensity fringes and random alignment may correspond to the high intensity fringes. These alignment modulations can result in a refractive index modulation in the waveguide. Furthermore, while alignment is orthogonal to waveguide axis 630 in the described embodiments, other alignment directions are also possible. For example, the LC can be aligned substantially parallel to the waveguide axis, or at some angle between 0 and 90 degrees with respect to the axis. The alignment direction will depend on the relative orientation of the capillary tube and the polarization state of the exposing radiation.

Internal capillary surfaces can be coated with an alignment material using a variety of methods. In some embodiments, a solution of the alignment material and a suitable volatile solvent can be drawn into the capillary tube by capillary action and/or by drawing a vacuum on the tube provided the solution has a sufficiently low viscosity and/or the bore of the capillary is sufficiently large. The solvent is allowed to evaporate, leaving behind a layer of alignment material on the capillary tube surface. In some embodiments, the tube material itself can provide the aligning function. For example, where the tube is polymeric (e.g., nylon, PVA, PET, or a polyimide), exposure to polarized UV can provide a surface anisotropy in the tube material sufficient to align an LC.

Alternatively, the outer surface of a cylindrical tube can be coated with an alignment material. Subsequently, the tube can be immersed in an LC, which aligns relative to the tube based on the type of alignment material and its exposure. In waveguiding applications, the waveguiding properties of the tube can be modified by changing the orientation of the LC (e.g., by application of an electric or magnetic field, or by thermally inducing an LC phase change).

Figure 8:
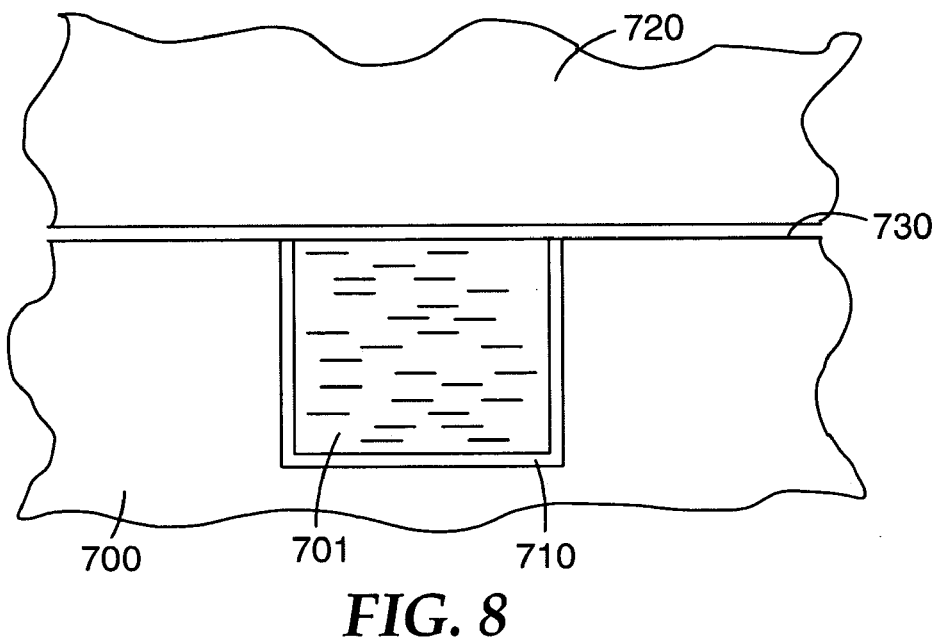
FIG. 8 is a cross-sectional view of a portion of a channel waveguide LC grating.

In some embodiments, the substrate can define a channel. For example, referring to FIG. 8, a substrate 700 defines a channel 701, which is covered by a layer 710 of an alignment material. Once exposed to polarized UV, the alignment material aligns an LC material introduced into the channel. In some embodiments, the channel may be sealed by a second substrate 720 and alignment material layer 730. Electrode layers (not shown) may also be included to provide an active device.

Channel 701 may be formed using a number of methods. Where the channel size is small (e.g., microns in width and/or depth), the channel may be etched into the substrate using methods common to the semiconductor industry. For larger channels (e.g., millimeters in width and/or depth), the substrate can be machined to provide the channel.

The devices disclosed herein have many potential applications. For example, they can be used in displays, in optical switching devices, in waveguides and waveguide couplers, and in security applications.

Figure 9A:
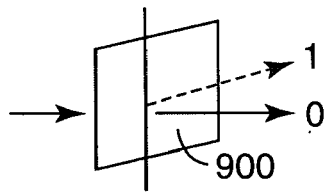
FIGS. 9A and 9B are schematic diagrams showing the operation of a switchable planar LC grating in an "off" (diffracting) and "on" (non-diffracting) state, respectively.
Figure 9B:
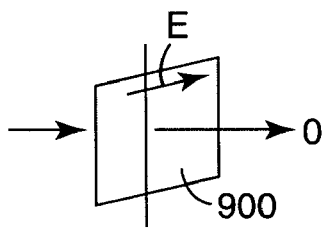

Referring to FIGS. 9A and 9B, an example of an optical switching devices is a switchable grating 900. In a diffractive state (e.g., with no voltage applied across the electrodes), shown in FIG. 9A, there exists a refractive index modulation corresponding to the modulation of LC alignment in the cell. Accordingly, light transmitted through the cell is diffracted into multiple orders. In the non-diffractive state (e.g., with an applied electric field), the LC substantially aligns relative to the applied field and the index modulation is largely eliminated. Transmitted light is no longer diffracted by the device, as shown in FIG. 9B. Depending on the index modulation, switchable gratings can be formed that diffract into one or more planes. For example, where the grating is formed using a two-beam interference pattern it diffracts in one plane. In other words, the diffracted beams are confined to a single plane. However, where a three or more beam interference pattern is used, the grating can diffract in multiple planes.

Figure 10A:
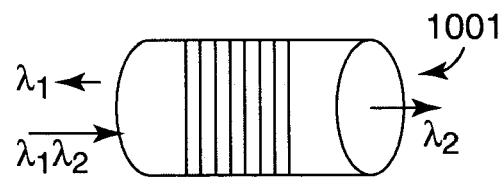
FIGS. 10A and 10B are schematic diagrams showing the operation of a switchable LC grating in a cylindrical waveguide in an "off" and "on" state, respectively.
Figure 10B:
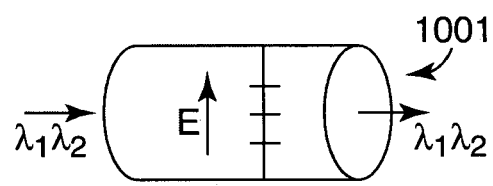

Referring to FIGS. 10A and 10B, switchable optical gratings can also operate in reflective mode. These figures show a switchable reflection grating in a waveguide 1001. In the reflective state, shown in FIG. 10A, LC alignment is modulated due to the patterned alignment material and a wavelength $\lambda_1$ (or band of wavelengths) is substantially reflected by the grating. The grating substantially transmits another wavelength, $\lambda_2$, which is away from the reflection band of the grating. When an electric field is applied to the cell, the LC reorients to align with the electric field and the index modulation is largely eliminated. Both $\lambda_1$ and $\lambda_2$ are substantially transmitted in this case, as shown in FIG. 10B.

Figure 11:
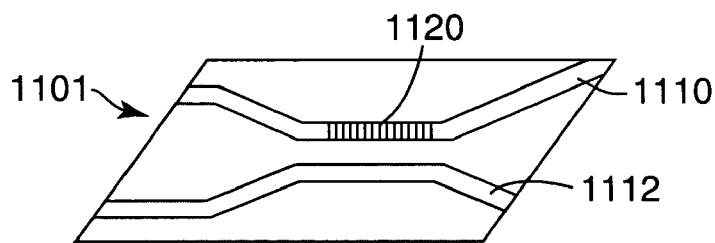
FIG. 11 is a schematic diagram of an evanescent coupler including an LC grating.

In some embodiments, the photoalignment techniques disclosed herein can be used to form switchable gratings in evanescent coupling devices. An example of such a device is shown in FIG. 11. Evanescent coupler 1101 includes two channel waveguides 1110 and 1112. Channel waveguide 1110 includes an LC grating 1120, formed by exposure of an alignment material layer (not shown) to an interference pattern. As a broadband wavelength stream propagates through the waveguide, an evanescent wave couples to the grating in the adjacent waveguide and a well defined wavelength is 'stripped' out the input stream, thereby dropping one of the wavelengths. An example application of this embodiment is an add/drop filter.

The alignment methods disclosed herein can be used to provide a diverse array of LC alignment patterns in optical cells. For example, two substrates can be exposed to an interference patterned formed from two beams with opposite handedness circular polarization. A cell can be constructed by orienting the substrates with alignment grating orthogonal to one another. When filled with a nematic LC, the alignment layers provide a twisted nematic (TN) configuration through the cell, with continuously varying alignment at the surfaces. Displays produced with such a configuration can provide superior viewing angle characteristics compared to TN displays having uniform alignment at each substrate. A number of additional explicit examples follow. In each example, each substrate includes a layer of a suitable alignment material, such as those discussed previously.

Referring to FIG. 12A–12G, in one example, both substrates of a cell are exposed (e.g., simultaneously exposed) to an interference pattern formed from two beams having circular polarization states of opposite handedness (see FIG. 12D). The interfering beams form an interference pattern having uniform intensity across the exposed substrate (see FIG. 12B), but with constantly varying linear polarization in the plane of the substrate (see FIG. 12C). LC aligns in the plane of each substrate, but the alignment direction varies as a function of position in the plane of the cell (see FIG. 12A, 12E, and 12F). LC can uniformly align through the depth of the cell (see FIG. 12G).

Figure 13A:
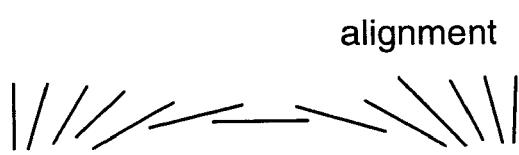
FIG. 13A–13G are schematic diagrams illustrating the formation and structure of an example of an optical cell preparing using photoalignment.
Figure 13B:
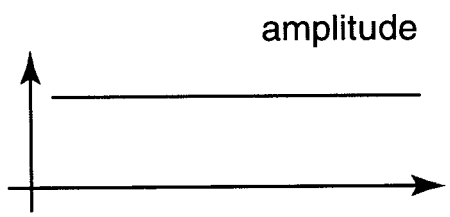
Figure 13C:
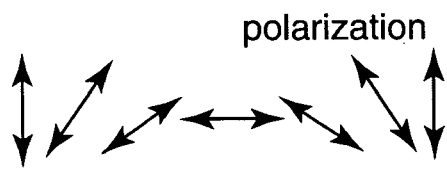
Figure 13D:
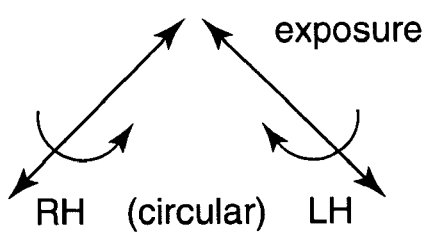
Figure 13E:
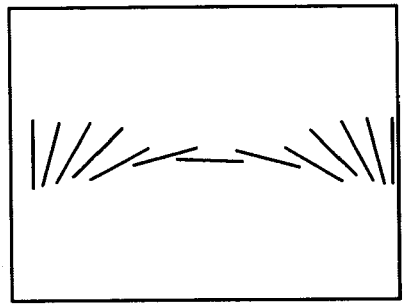
Figure 13F:
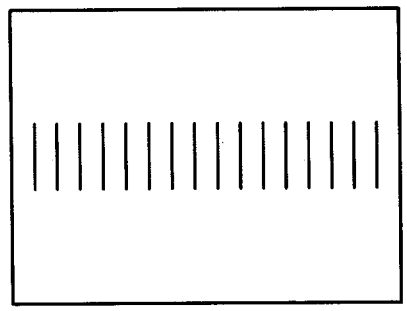
Figure 13G:
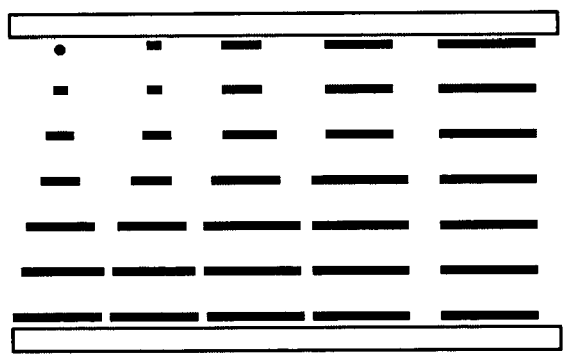

Referring to FIG. 13A–13G, in another example, one substrate of a cell is exposed to an interference pattern formed from two beams having circular polarization states of opposite handedness (see FIG. 13D). The interfering beams form an interference pattern having uniform intensity across the exposed substrate (see FIG. 13B), but with constantly varying linear polarization in the plane of the substrate (see FIG. 13C). LC aligns in the plane of the exposed substrate, but the alignment direction varies as a function of position in the plane of the substrate (see FIGS. 13A and 13E). The other substrate is prepared to provide homogeneous planar alignment (e.g., by blanket exposure to polarized radiation or by buffing). Where the alignment direction on the substrates is parallel, LC is uniformly aligned through the cell's depth. In other regions of the cell the LC twists by varying amounts through the cell's depth (see FIG. 13G).

Referring to FIG. 14A–14G, in a further example, one substrate of a cell is exposed to an interference pattern formed from two beams having circular polarization states of opposite handedness (see FIG. 14D). The interfering beams form an interference pattern having uniform intensity across the exposed substrate (see FIG. 14B), but with constantly varying linear polarization in the plane of the substrate (see FIG. 14C). LC aligns in the plane of the exposed substrate, but the alignment direction varies as a function of position in the plane of the substrate (see FIGS. 14A and 14E). The other substrate is prepared to provide homeotropic alignment (see FIG. 14F). The LC alignment with respect to the plane of the cell can vary through the depth of the cell. The alignment also varies in the plane of cell at the substrate exposed to the interference pattern (see FIG. 14G).

Figure 15A:
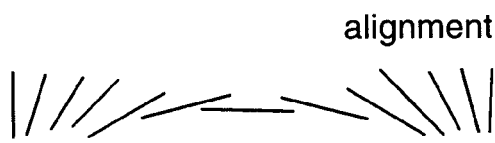
FIG. 15A–15H are schematic diagrams illustrating the formation and structure of an example of an optical cell preparing using photoalignment.
Figure 15E:
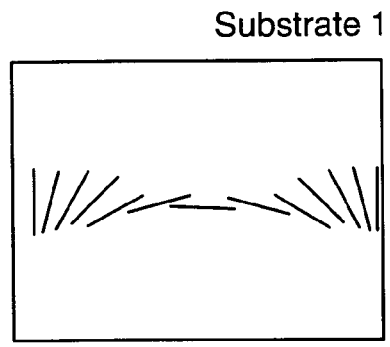
Figure 15B:
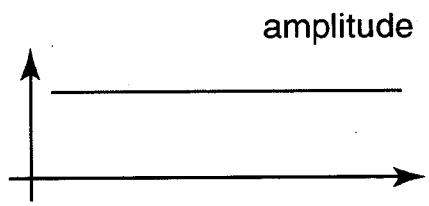
Figure 15F:
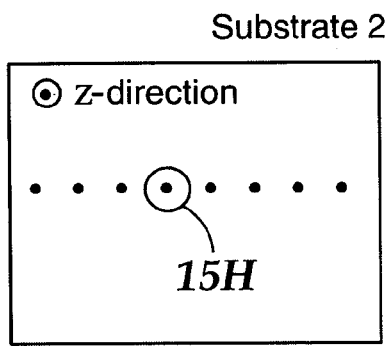
Figure 15C:
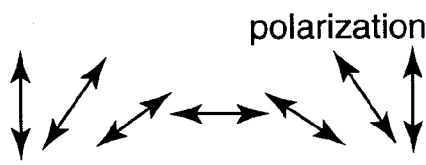
Figure 15G:
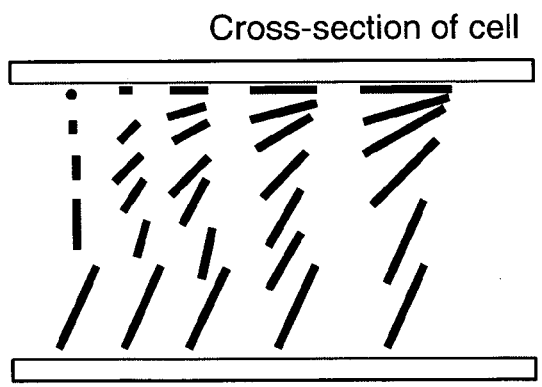
Figure 15D:
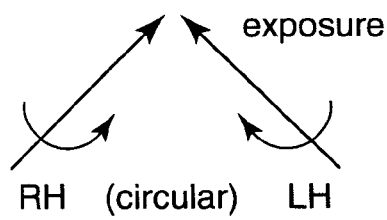
Figure 15H:
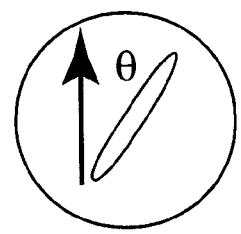

Referring to FIG. 15A–15H, in a further example, one substrate of a cell is exposed to an interference pattern formed from two beams having circular polarization states of opposite handedness (see FIG. 15D). The interfering beams form an interference pattern having uniform intensity across the exposed substrate (see FIG. 15B), but with constantly varying linear polarization in the plane of the substrate (see FIG. 15C). LC aligns in the plane of the exposed substrate, but the alignment direction varies as a function of position in the plane of the substrate (see FIGS. 15A and 15E). The other substrate is prepared to provide uniform alignment at an angle θ with respect to the substrate normal (see FIGS. 15F and 15H). The LC alignment with respect to the plane of the cell can vary through the depth of the cell. The alignment also varies in the plane of cell at the substrate exposed to the interference pattern (see FIG. 15G).

Referring to FIG. 16A–16G, in yet another example, both substrates of a cell are exposed (e.g., simultaneously exposed) to an interference pattern formed from two beams having parallel linear polarization states (see FIG. 16D). The interfering beams form an interference pattern having varying intensity across the exposed substrate (see FIG. 16B), but with parallel linear polarization in the plane of the substrate (see FIG. 16C). In regions of the substrates exposed to the bright interference fringes, LC aligns in the plane of each substrate parallel to the direction of the interference patterns polarization. LC aligns randomly in regions of the substrates exposed to the low intensity fringes (see FIG. 16A, 16E, and 16F). Where the LC is randomly aligned at the substrates, it can be randomly aligned through the depth of the cell, while it can be uniformly aligned through the cell's depth adjacent the aligned regions of the substrate (see FIG. 16G).

Referring to FIG. 17A–17G, in another example, one substrate of a cell is exposed to an interference pattern formed from two beams having parallel linear polarization states (see FIG. 17D). The interfering beams form an interference pattern having varying intensity (i.e., amplitude) across the exposed substrate (see FIG. 17B), but with parallel linear polarization in the plane of the substrate (see FIG. 17C). In regions of the substrates exposed to the bright interference fringes, LC aligns in the plane of each substrate parallel to the direction of the interference patterns polarization. LC aligns randomly in regions of the substrates exposed to the low intensity fringes (see FIG. 17A and 17E). The other substrate is prepared to provide homogeneous planar alignment (e.g., by blanket exposure to polarized radiation or by buffing). Adjacent regions of the substrate exposed to high intensity interference fringes, LC can be uniformly aligned through the cell's depth. In other regions, alignment varies from homogeneous planar alignment to random alignment through the cell's depth (see FIG. 17G).

Referring to FIG. 18A–18G, in a further example, one substrate of a cell is exposed to an interference pattern formed from two beams having parallel linear polarization states (see FIG. 18D). The interfering beams form an interference pattern having varying intensity across the exposed substrate (see FIG. 18B), but with parallel linear polarization in the plane of the substrate (see FIG. 18C). In regions of the substrates exposed to the bright interference fringes, LC aligns in the plane of each substrate parallel to the direction of the interference patterns polarization. LC aligns randomly in regions of the substrates exposed to the low intensity fringes (see FIGS. 18A and 18E). The other substrate is prepared to provide homeotropic alignment (see FIG. 18F). The LC alignment with respect to the plane of the cell can vary through the depth of the cell. The alignment also varies in the plane of cell at the substrate exposed to the interference pattern (see FIG. 18G).

Figure 19A:
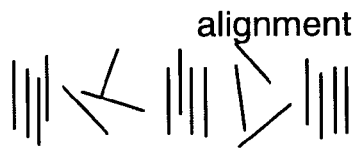
FIG. 19A–19H are schematic diagrams illustrating the formation and structure of an example of an optical cell preparing using photoalignment.
Figure 19B:
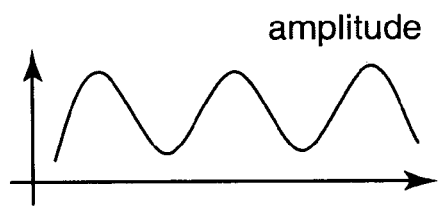
Figure 19C:
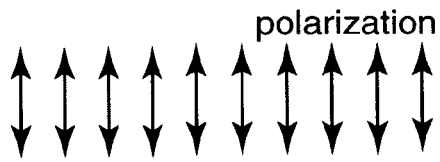
Figure 19D:
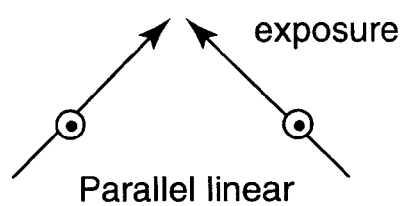
Figure 19E:
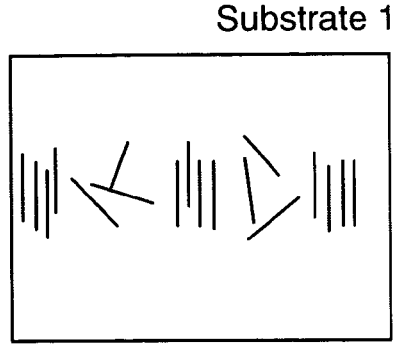
Figure 19F:
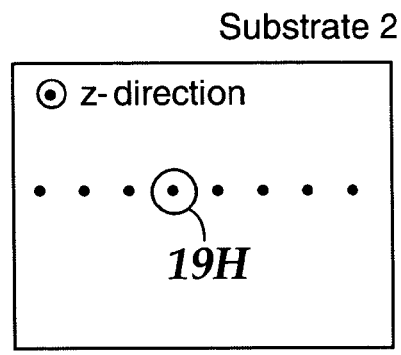
Figure 19G:
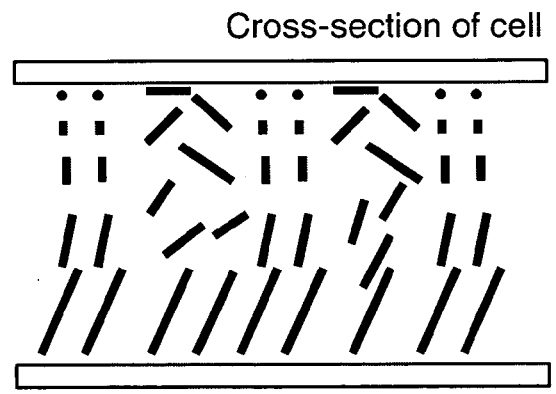
Figure 19H:
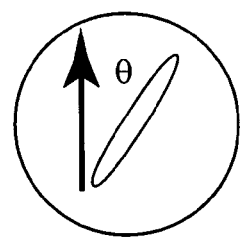

Referring to FIG. 19A–19H, in another example, one substrate of a cell is exposed to an interference pattern formed from two beams having parallel linear polarization states (see FIG. 19D). The interfering beams form an interference pattern having varying intensity (i.e., amplitude) across the exposed substrate (see FIG. 19B), but with parallel linear polarization in the plane of the substrate (see FIG. 19C). In regions of the substrates exposed to the bright interference fringes, LC aligns in the plane of each substrate parallel to the direction of the interference patterns polarization. LC aligns randomly in regions of the substrates exposed to the low intensity fringes (see FIGS. 19A and 19E). The other substrate is prepared to provide uniform alignment at an angle θ with respect to the substrate normal (see FIGS. 19F and 19H). The LC alignment with respect to the plane of the cell can vary through the depth of the cell. The alignment also varies in the plane of cell at the substrate exposed to the interference pattern (see FIG. 19G).

Figure 20A:
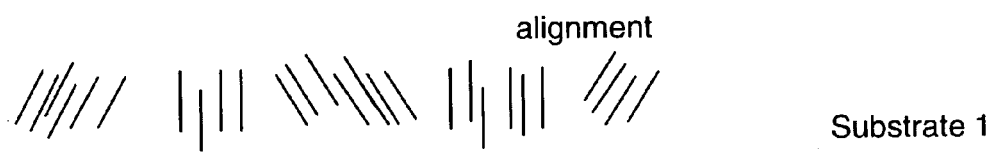
FIG. 20A–20G are schematic diagrams illustrating the formation and structure of an example of an optical cell preparing using photoalignment.
Figure 20E:
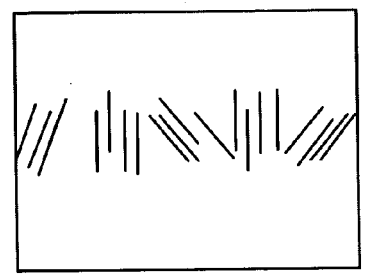
Figure 20B:
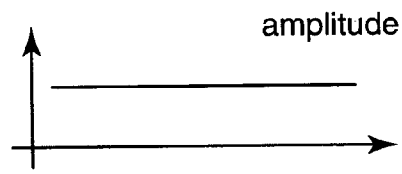
Figure 20F:
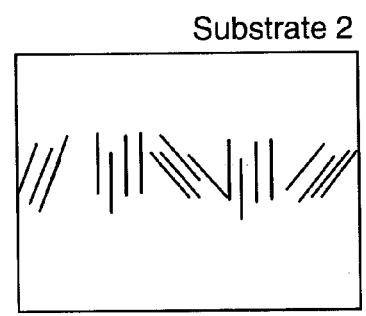
Figure 20C:
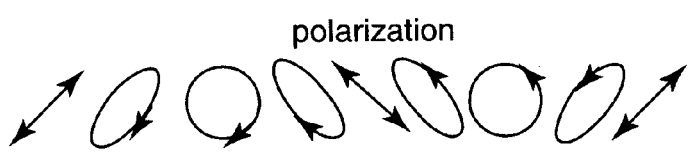
Figure 20D:
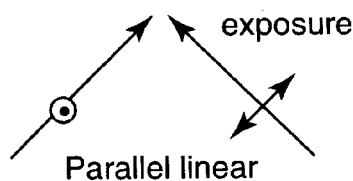
Figure 20G:
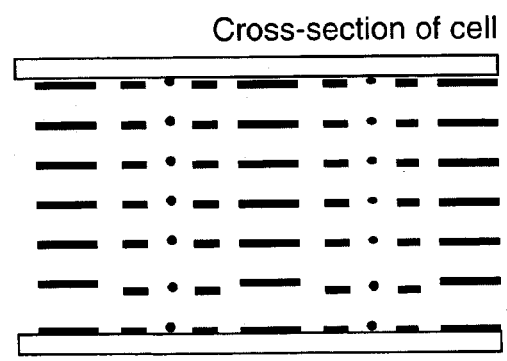

Referring to FIG. 20A–20G, in yet another example, both substrates of a cell are exposed (e.g., simultaneously exposed) to an interference pattern formed from two beams having orthogonal linear polarization states (see FIG. 20D). The interfering beams form an interference pattern having uniform intensity across the exposed substrate (see FIG. 20B), but with constantly varying polarization in the plane of the substrate, including linear, elliptical, and circular polarization regions (see FIG. 20C). LC aligns in the plane of each substrate, but the alignment direction varies as a function of position in the plane of the cell (see FIG. 20A, 20E, and 20F). LC can be uniformly aligned through the depth of the cell (see FIG. 20G).

Referring to FIG. 21A–21G, in another example, one substrate of a cell is exposed to an interference pattern formed from two beams having orthogonal linear polarization states (see FIG. 21D). The interfering beams form an interference pattern having uniform intensity across the exposed substrate (see FIG. 21B), but with constantly varying polarization in the plane of the substrate, including linear, elliptical, and circular polarization regions (see FIG. 21C). LC aligns in the plane of the exposed substrate, but the alignment direction varies as a function of position in the plane of the substrate (see FIGS. 21A and 21E). The other substrate is prepared to provide homogeneous planar alignment (e.g., by blanket exposure to polarized radiation or by buffing). Where the alignment direction on the substrates is parallel, LC can be uniformly aligned through the cell's depth. In other regions of the cell the LC twists by varying amounts through the cell's depth (see FIG. 21G).

Referring to FIG. 22A–22G, in a further example, one substrate of a cell is exposed to an interference pattern formed from two beams having orthogonal linear polarization states (see FIG. 22D). The interfering beams form an interference pattern having uniform intensity across the exposed substrate (see FIG. 22B), but with constantly varying polarization in the plane of the substrate, including linear, elliptical, and circular polarization regions (see FIG. 22C). LC aligns in the plane of the exposed substrate, but the alignment direction varies as a function of position in the plane of the substrate (see FIGS. 22A and 22E). The other substrate is prepared to provide homeotropic alignment (see FIG. 22F). The LC alignment with respect to the plane of the cell can vary through the depth of the cell. The alignment also varies in the plane of cell at the substrate exposed to the interference pattern (see FIG. 22G).

Referring to FIG. 23A–23H, in a further example, one substrate of a cell is exposed to an interference pattern formed from two beams having orthogonal linear polarization states (see FIG. 23D). The interfering beams form an interference pattern having uniform intensity across the exposed substrate (see FIG. 23B), but with constantly varying polarization in the plane of the substrate, including linear, elliptical, and circular polarization regions (see FIG. 23C). LC aligns in the plane of the exposed substrate, but the alignment direction varies as a function of position in the plane of the substrate (see FIGS. 23A and 23E). The other substrate is prepared to provide uniform alignment at an angle θ with respect to the substrate normal (see FIGS. 23F and 23H). The LC alignment with respect to the plane of the cell can vary through the depth of the cell. The alignment also varies in the plane of cell at the substrate exposed to the interference pattern (see FIG. 23G).

Figure 24A:
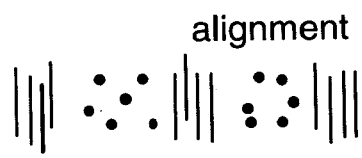
FIG. 24A–24G are schematic diagrams illustrating the formation and structure of an example of an optical cell preparing using photoalignment.
Figure 24B:
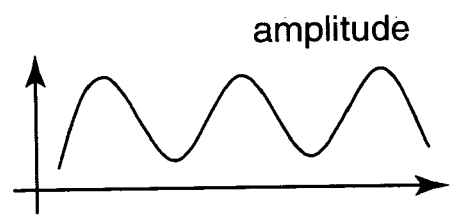
Figure 24C:
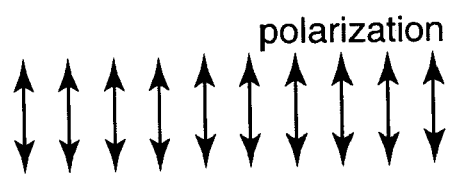
Figure 24D:
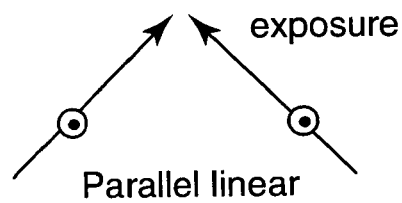
Figure 24E:
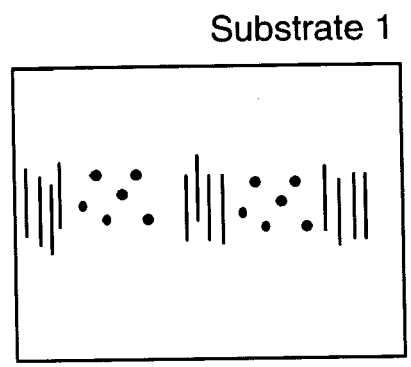
Figure 24F:
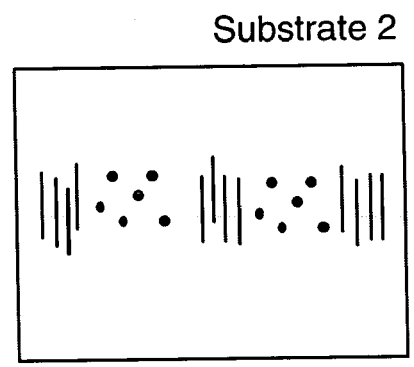
Figure 24G:
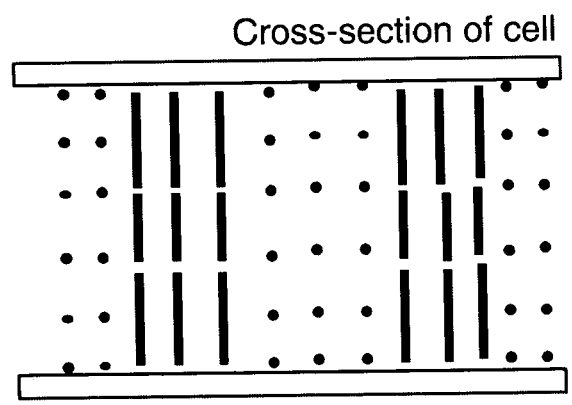

Referring to FIG. 24A–24G, in yet another example, both substrates of a cell are exposed (e.g., simultaneously exposed) to an interference pattern formed from two beams having parallel linear polarization states (see FIG. 24D). The interfering beams form an interference pattern having varying intensity across the exposed substrate (see FIG. 24B), but with parallel linear polarization in the plane of the substrate (see FIG. 24C). In regions of the substrates exposed to the bright interference fringes, LC aligns in the plane of each substrate parallel to the direction of the interference patterns polarization. LC aligns homeotropically in regions of the substrates exposed to the low intensity fringes (see FIG. 24A, 24E, and 24F). LC alignment varies between planar and homeotropic, which can remain uniform through the depth of the cell.

Referring to FIG. 25A–25G, in another example, one substrate of a cell is exposed to an interference pattern formed from two beams having parallel linear polarization states (see FIG. 25D). The interfering beams form an interference pattern having varying intensity (i.e., amplitude) across the exposed substrate (see FIG. 25B), but with parallel linear polarization in the plane of the substrate (see FIG. 25C). In regions of the substrates exposed to the bright interference fringes, LC aligns in the plane of each substrate parallel to the direction of the interference patterns polarization. LC aligns homeotropically in regions of the substrates exposed to the low intensity fringes (see FIGS. 25A and 25E). The other substrate is prepared to provide homogeneous planar alignment (e.g., by blanket exposure to polarized radiation or by buffing). Adjacent regions of the substrate exposed to high intensity interference fringes, LC can be uniformly aligned through the cell's depth. In other regions, alignment can vary from homogeneous planar alignment to planar alignment through the cell's depth (see FIG. 25G).

Figure 26A:
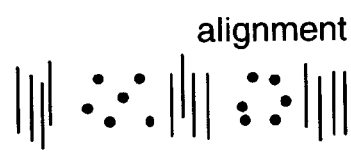
FIG. 26A–26G are schematic diagrams illustrating the formation and structure of an example of an optical cell preparing using photoalignment.
Figure 26B:
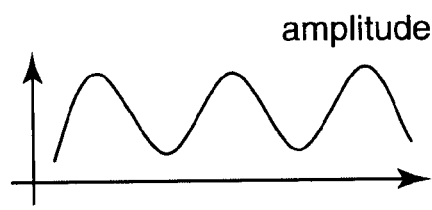
Figure 26C:
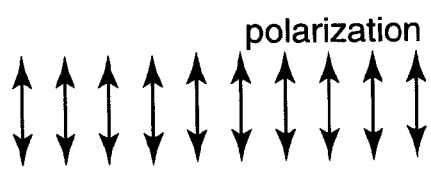
Figure 26D:
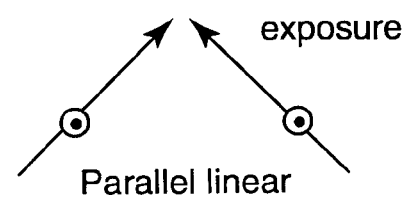
Figure 26E:
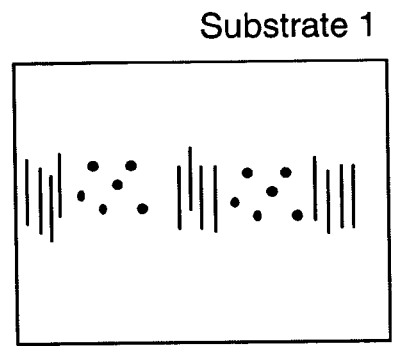
Figure 26F:
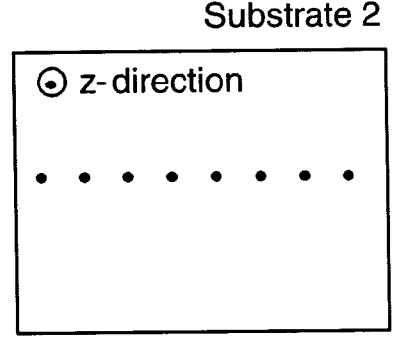
Figure 26G:
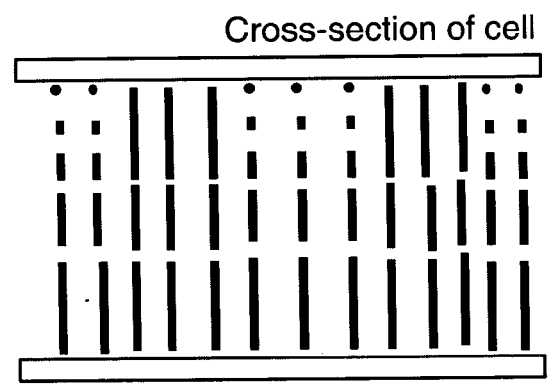

Referring to FIG. 26A–26G, in a further example, one substrate of a cell is exposed to an interference pattern formed from two beams having parallel linear polarization states (see FIG. 26D). The interfering beams form an interference pattern having varying intensity (i.e., amplitude) across the exposed substrate (see FIG. 26B), but with parallel linear polarization in the plane of the substrate (see FIG. 26C). In regions of the substrates exposed to the bright interference fringes, LC aligns in the plane of each substrate parallel to the direction of the interference patterns polarization. LC aligns homeotropically in regions of the substrates exposed to the low intensity fringes (see FIGS. 26A and 26E). The other substrate is prepared to provide homeotropic alignment (see FIG. 26F). The LC alignment with respect to the plane of the cell can vary through the depth of the cell adjacent regions of the exposed substrate having planar alignment. The alignment can be uniformly homeotropic through the depth of the cells in other regions (see FIG. 26G).

Figure 27A:
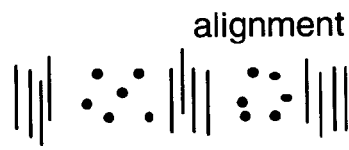
FIG. 27A–27H are schematic diagrams illustrating the formation and structure of an example of an optical cell preparing using photoalignment.
Figure 27B:
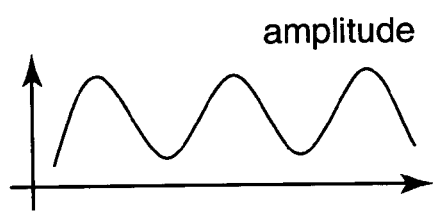
Figure 27C:
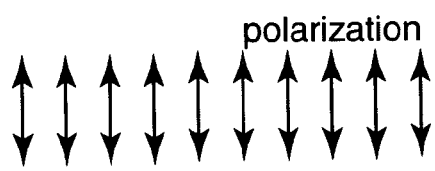
Figure 27D:
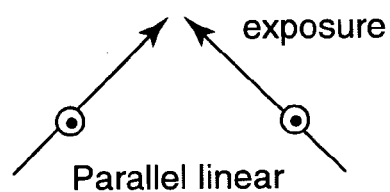
Figure 27E:
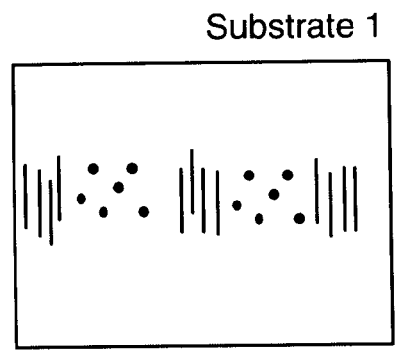
Figure 27F:
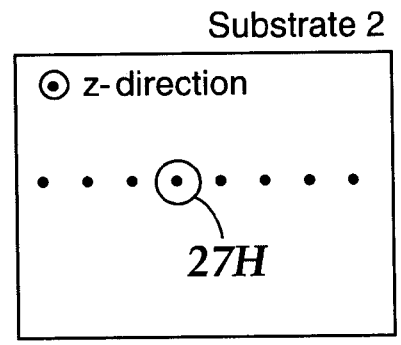
Figure 27G:
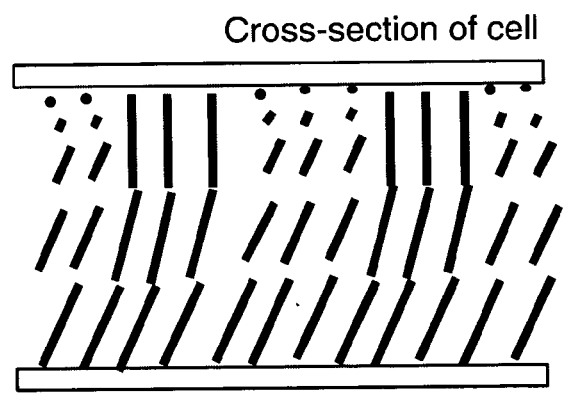
Figure 27H:
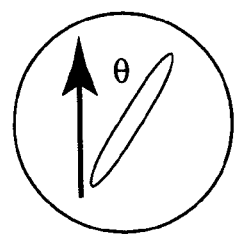

Referring to FIG. 27A–27H, in another example, one substrate of a cell is exposed to an interference pattern formed from two beams having parallel linear polarization states (see FIG. 27D). The interfering beams form an interference pattern having varying intensity (i.e., amplitude) across the exposed substrate (see FIG. 27B), but with parallel linear polarization in the plane of the substrate (see FIG. 27C). In regions of the substrates exposed to the bright interference fringes, LC aligns in the plane of each substrate parallel to the direction of the interference patterns polarization. LC aligns homeotropically in regions of the substrates exposed to the low intensity fringes (see FIGS. 27A and 27E). The other substrate is prepared to provide uniform alignment at an angle θ with respect to the substrate normal (see FIGS. 27F and 27H). The LC alignment with respect to the plane of the cell can vary through the depth of the cell. The alignment can also vary in the plane of cell at the substrate exposed to the interference pattern (see FIG. 27G).

Figure 28A:
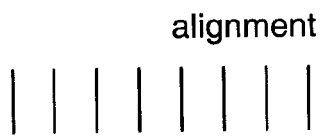
Figure 28E:
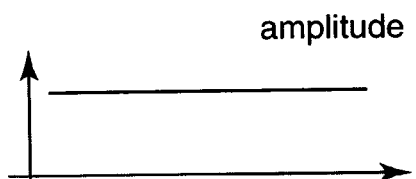
Figure 28B:
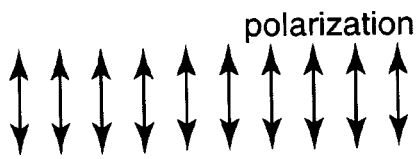
Figure 28F:
Figure 28C:
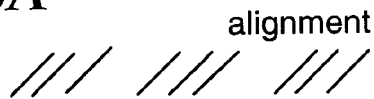
Figure 28G:
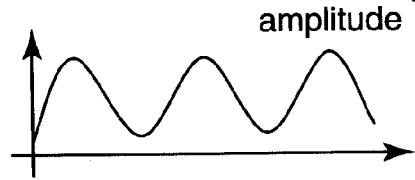
Figure 28D:
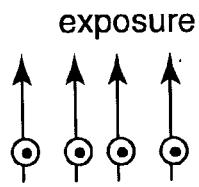
Figure 28H:
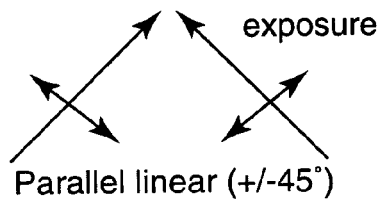
Figure 28I:
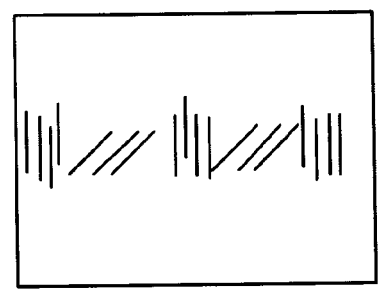
Figure 28K:
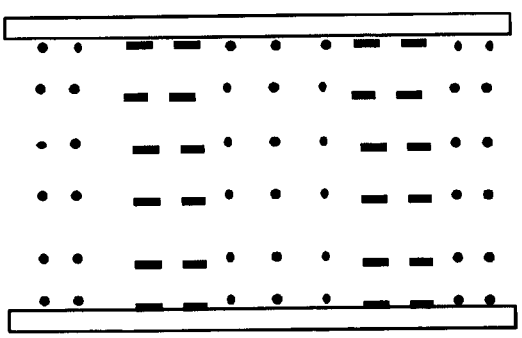
Figure 31A:
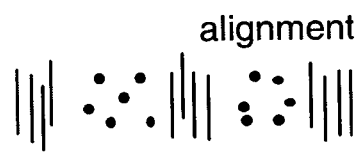
FIG. 31A–31G are schematic diagrams illustrating the formation and structure of an example of an optical cell preparing using photoalignment.
Figure 31B:
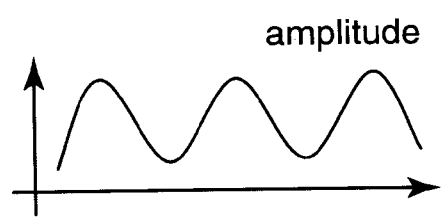
Figure 31C:
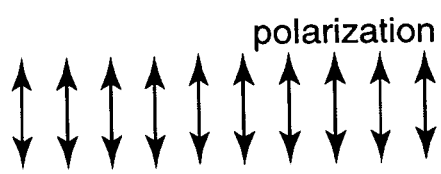
Figure 31D:
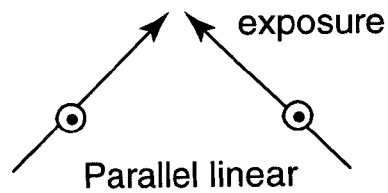
Figure 31E:
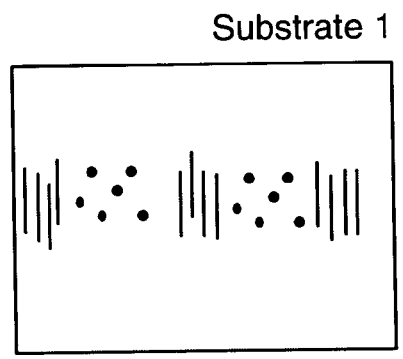
Figure 31F:
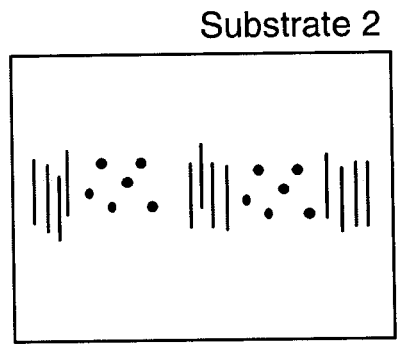
Figure 31G:
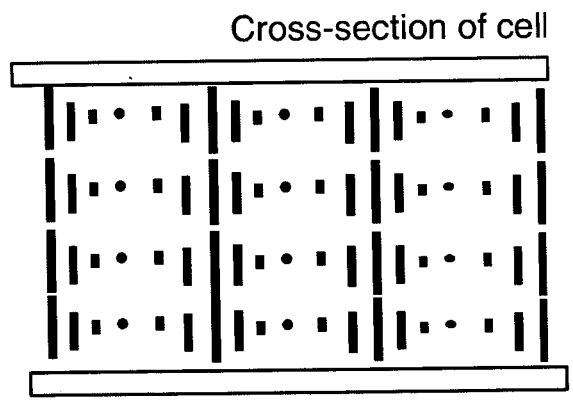

As discussed previously, in some embodiments, substrates can be exposed more than once to provide a desired alignment pattern. For example, referring to FIG. 28A–28K, two substrates are exposed (e.g., simultaneously exposed) to a blanket exposure of polarized radiation (see FIG. 28B–28D), which induces parallel homogeneous LC alignment at the substrates (see FIG. 28A). Subsequently, the substrates are exposed (e.g., simultaneously exposed) to an interference pattern formed from linearly polarized beams (see FIG. 28H). The beam polarization is oriented to provide uniform linear polarization at an angle (e.g., about 45 degrees) with respect to the polarization orientation of the first exposure (see FIG. 28G). The interference pattern has a varying intensity (see FIG. 28H). Exposure of regions of the substrate to bright interference fringes overwrites alignment caused by the initial exposure. However, LC alignment in the regions of the substrates exposed to the dark fringes is parallel to the polarization orientation of the first exposure (see FIGS. 28I and 28J). Accordingly, the cell can include planar aligned regions which are uniform through the cells depth, but have different orientation in the plane of the cell (see FIG. 28K).

Figure 29J:
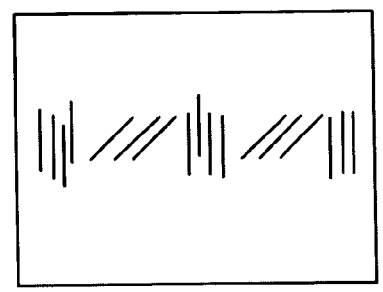

Referring to FIG. 29A–29M, in another example, a cell is formed having regions of LC with differing pretilt angles. Regions having a first pretilt angle are produced by exposing (e.g., simultaneously exposing) the substrates to linearly polarized radiation (see FIGS. 29C and 29D) of uniform intensity (see FIG. 29B). This exposure induces uniform alignment of a first pretilt angle, θ, relative to the substrate normal (see FIGS. 29A and 29L). Subsequently, the substrates are exposed (e.g., simultaneously exposed) to an interference pattern formed from linearly polarized beams (see FIG. 29H). The beam polarization is uniformly oriented across the exposure area (see FIG. 29G). The interference pattern has a varying intensity (see FIG. 29F). Exposure of regions of the substrate to bright interference fringes overwrites alignment caused by the initial exposure. The subsequent exposure induces alignment of a second pretilt angle, θ', relative to the substrate normal (see FIGS. 29E and 29M). Accordingly, the cell has multiple regions of LC having different pretilt (see FIG. 29K).

Referring to FIG. 30A–30H, in a further example, cell substrates are first buffed to provide a first planar alignment direction (see FIG. 30A). Subsequently, the substrates are exposed (e.g., simultaneously exposed) to an interference pattern formed from two parallel linearly polarized beams (see FIG. 30E). The polarization state of the interference pattern is uniformly oriented across the exposure area (see FIG. 30D), but the intensity varies (see FIG. 30C). The bright fringes induces alignment parallel to the interference pattern polarization orientation (see FIGS. 30F and 30G), which propagates through the depth of the cell (see FIG. 30H).

Referring to FIG. 31A–31G, in a further example, a chiral nematic LC, instead of a nematic LC, is used. Both substrates of a cell are exposed (e.g., simultaneously exposed) to an interference pattern formed from two beams having parallel linear polarization states (see FIG. 31D). The interfering beams form an interference pattern having varying intensity across the exposed substrate (see FIG. 31B), but with parallel linear polarization in the plane of the substrate (see FIG. 31C). In regions of the substrates exposed to the bright interference fringes, LC aligns in the plane of each substrate parallel to the direction of the interference patterns polarization. LC aligns homeotropically in regions of the substrates exposed to the low intensity fringes (see FIG. 31A, 31E, and 31F). LC alignment varies between planar and homeotropic which remains uniform through the depth of the cell. The fringe period and chiral pitch are matched, causing the chiral helices to extend uniformly in the plane of the cell (see FIG. 31G).

EXAMPLES

Example 1

Planar Grating Using a Photosensitive Polyimide

To prepare a planar grating, two 1×1 inch ITO-coated glass substrates were cleaned by ethyl alcohol. After cleaning, a layer of Optmer AL 1051-R2 (from JSR Micro) was spin coated onto the ITO bearing surface. The coated substrates were heated for 1 minute at 65° C. to drive off excess solvent. Five micrometer spacers (obtained from EM Industries) were distributed on the coated surfaces, after which the substrates were bonded together with an edge seal formed using Norland Optical Adhesive (e.g NOA 91). A region of the cell was exposed to an interference pattern formed using an Ar$^+$ laser emitting radiation at 351 nm (from Coherent, Inc., Santa Clara, Calif.). The laser output was split into two beams using a non-polarizing beamsplitter, and overlapped to form an interference pattern. The relative angle between the beam propagation directions was approximately 12° and the interference fringe period was about 1.2 micrometers. Laser radiation was provided at 351 nm, having a power of 150 mW and a beam spot size of about 1.5 cm$^2$. The cell was exposed for about 30 seconds. After exposure, the cell was back-filled with a nematic LC, BL038 (obtained from EM Industries, Hawthorne, N.Y.). Polarized optical microscopy revealed periodic homogeneously and randomly aligned regions corresponding to the interference fringes.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
   exposing an alignment material to an interference pattern having uniform intensity formed from two beams having circular polarization states of opposite handedness to cause a chemical reaction in the alignment material; and
   exposing the alignment material to a liquid crystal, wherein the liquid crystal aligns relative to the alignment material based on the interference pattern.

2. The method of claim 1, wherein the chemical reaction causes polymerization in the alignment material.

3. The method of claim 1, wherein the chemical reaction causes depolymerization in the alignment material.

4. The method of claim 1, wherein the chemical reaction comprises a photochemical reaction.

5. The method of claim 1, wherein a surface of the alignment material is exposed to the interference pattern.

6. The method of claim 5, wherein the surface is substantially planar.

7. The method of claim 5, wherein the surface is curved.

8. The method of claim 7, wherein the surface is an inner-surface of a tube.

9. The method of claim 8, wherein the tube comprises one of a glass and a polymer.

10. The method of claim 5, wherein the surface comprises a channel.

11. The method of claim 1, wherein the alignment material is disposed on a surface of a substrate comprising a substrate material.

12. The method of claim 11, wherein the substrate material is at least one of a glass, a polymer, a metal and a semi-conductor.

13. The method of claim 12, wherein the substrate comprises an electrode layer.

14. The method of claim 13, wherein the electrode layer comprises a transparent electrically conductive material.

15. The method of claim 12, wherein the substrate comprises a thin film transistor.

16. The method of claim 1, wherein the liquid crystal permeates the alignment material.

17. The method of claim 1, wherein the alignment material comprises a liquid crystal.

18. The method of claim 1, wherein the alignment material comprises a polymer.

19. The method of claim 18, wherein the polymer comprises a cinnamate group.

20. The method of claim 18, wherein the polymer is a polyimide.

21. The method of claim 1, wherein the alignment material comprises a silane.

22. The method of claim 1, wherein the beams comprise UV radiation.

23. The method of claim 1, wherein the interference pattern comprises regions of different polarization.

24. The method of claim 23, wherein the interference pattern comprises regions of different linear polarization.

25. The method of claim 23, wherein the liquid crystal aligns relative to the alignment material based on the polarization of the interference pattern.

26. The method of claim 1, wherein at least a portion of the liquid crystal aligns substantially homogeneously relative to a surface of the alignment material.

27. The method of claim 1, wherein the liquid crystal is disposed on the surface prior to exposure to the interference pattern.

28. The method of claim 1, wherein the liquid crystal is disposed on the surface after exposure to the interference pattern.

29. The method of claim 1, further comprising rubbing a surface of the alignment material prior to exposing the alignment material to the interference pattern.

30. The method of claim 1, further comprising exposing a surface of the alignment material to polarized radiation prior to exposing the alignment material to the interference pattern.

* * * * *